(12) United States Patent
Kurano et al.

(10) Patent No.: US 7,099,563 B1
(45) Date of Patent: Aug. 29, 2006

(54) MULTICHANNEL RECORDING DEVICE AND METHOD

(75) Inventors: Tomoaki Kurano, Yokohama (JP); Shinichi Kikuchi, Yokohama (JP); Shuichi Hisatomi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 09/645,619

(22) Filed: Aug. 25, 2000

(30) Foreign Application Priority Data

Aug. 27, 1999 (JP) .................................. 11-242204

(51) Int. Cl.
   *H04N 5/91* (2006.01)
   *H04N 9/79* (2006.01)
   *H04N 11/00* (2006.01)

(52) U.S. Cl. ........................... 386/95; 386/94; 386/96; 386/46; 348/461

(58) Field of Classification Search ................ 386/108, 386/122, 124, 125–126, 36, 40, 92, 70, 112, 386/94–96, 48, 1, 45–47, 52, 64, 98, 105–106; 725/50; 348/46; 360/12–13; 368/83–84
See application file for complete search history.

(56) References Cited

U.S. PATENT DOCUMENTS

| | | | | |
|---|---|---|---|---|
| 5,630,006 A | * | 5/1997 | Hirayama et al. ............. | 386/92 |
| 6,064,643 A | * | 5/2000 | Tanoue et al. ............ | 369/275.3 |
| 6,112,009 A | * | 8/2000 | Kikuchi et al. ............... | 386/95 |
| 6,233,389 B1 | * | 5/2001 | Barton et al. .................. | 386/46 |
| 6,278,837 B1 | * | 8/2001 | Yasukohchi et al. ......... | 386/108 |
| 6,411,770 B1 | * | 6/2002 | Ito et al. ........................ | 386/46 |
| 6,512,882 B1 | * | 1/2003 | Teunissen ..................... | 386/70 |
| 6,654,543 B1 | * | 11/2003 | Ando et al. .................... | 386/95 |
| 2002/0015581 A1 | * | 2/2002 | Ando et al. .................... | 386/95 |
| 2002/0046328 A1 | * | 4/2002 | Okada ........................ | 711/151 |

FOREIGN PATENT DOCUMENTS

| | | |
|---|---|---|
| JP | 7-129624 | 5/1995 |
| JP | 10-327383 | 12/1998 |

* cited by examiner

*Primary Examiner*—Thai Tran
*Assistant Examiner*—Jamie Vent
(74) *Attorney, Agent, or Firm*—Pillsbury Winthrop Shaw Pittman, LLP

(57) ABSTRACT

The present invention is directed to a recording device and method for recording digital data constituting a program on a disc-shaped recording medium using a specified minimum data length (CDA) unit that must be contiguous. Digital data constituting a first and second programs that are mutually different are alternately recorded on the disc-shaped recording medium using the specified data length (CDA) unit.

8 Claims, 29 Drawing Sheets

| Byte Number | CDA START ADDRESS: 3 BYTES | CDA SIZE : 2 BYTES | NEXT CDA NUMBER: 2 BYTES |
|---|---|---|---|
| 0 | CDA1:0323e(h) | 0e00(h) | 0002(h) |
| 7 | CDA2:0331e0(h) | 0e00(h) | 0003(h) |
| ... | ... | ... | ... |
| 35 | CDA6:0369e0(h) | 0e00(h) | 0007(h) |
| 42 | CDA7:037d90(h) | 0e00(h) | 0008(h) |
| ... | ... | ... | ... |
| 91 | CDA14:03df90(h) | 0e00(h) | 000F(h) |
| ... | ... | ... | ... |
| 2121 | CDA304:158dd0(h) | 0e00(h) | 0131(h) |
| ... | ... | ... | ... |
| 2247 | CDA322:1689d0(h) | 0e00(h) | 0000(h) |
| 2254 | ffffff(h) | ffff(h) | ffff(h) |

(ZONE 0, ZONE 1, ZONE 23)

| Byte Number | start CDA Number (2 BYTES) | Byte Number | End Address in End CDA (2 BYTES) |
|---|---|---|---|
| 2261 | 0001(h) | 2263 | 0001(h) |

START VOBS WITH CDA WITH START CDA NUMBER AND FOLLOW CDA CHAIN USING NEXT CDA NUMBER. IF NEXT CDA NUMBER IS 00, THIS MEANS END OF VOBS FILE. SUBSEQUENT CDAS REMAIN UNUSED (ONE DISC CONTAINS ONE VOBS FILE). FURTHER, End address in End CDA INDICATES FINAL ADDRESS OF RECORDED DATA SECTOR WITHIN END CDA (RSN RELATIVE TO LEADING CDA)

FIG. 2

| Byte Number | | CDA START ADDRESS: 3 BYTES | CDA SIZE : 2 BYTES | NEXT CDA NUMBER: 2 BYTES |
|---|---|---|---|---|
| ZONE 0 | 0 | CDA1:0323e(h) | 0e00(h) | 0002(h) |
| | 7 | CDA2:0331e0(h) | 0e00(h) | 0003(h) |
| | ... | ... | ... | ... |
| | 35 | CDA6:0369e0(h) | 0e00(h) | 0007(h) |
| ZONE 1 | 42 | CDA7:037d90(h) | 0e00(h) | 0008(h) |
| | ... | ... | ... | ... |
| | 91 | CDA14:03df90(h) | 0e00(h) | 000F(h) |
| ⋮ | ... | ... | ... | ... |
| ZONE 23 | 2121 | CDA304:158dd0(h) | 0e00(h) | 0131(h) |
| | ... | ... | ... | ... |
| | 2247 | CDA322:1689d0(h) | 0e00(h) | 0000(h) |
| | 2254 | ffffff(h) | ffff(h) | ffff(h) |

| Byte Number | start CDA Number (2 BYTES) | Byte Number | End Address in End CDA (2 BYTES) |
|---|---|---|---|
| 2261 | 0001(h) | 2263 | 0001(h) |

START VOBS WITH CDA WITH START CDA NUMBER AND FOLLOW CDA CHAIN USING NEXT CDA NUMBER. IF NEXT CDA NUMBER IS 00, THIS MEANS END OF VOBS FILE. SUBSEQUENT CDAS REMAIN UNUSED (ONE DISC CONTAINS ONE VOBS FILE). FURTHER, End address in End CDA INDICATES FINAL ADDRESS OF RECORDED DATA SECTOR WITHIN END CDA (RSN RELATIVE TO LEADING CDA)

FIG. 4

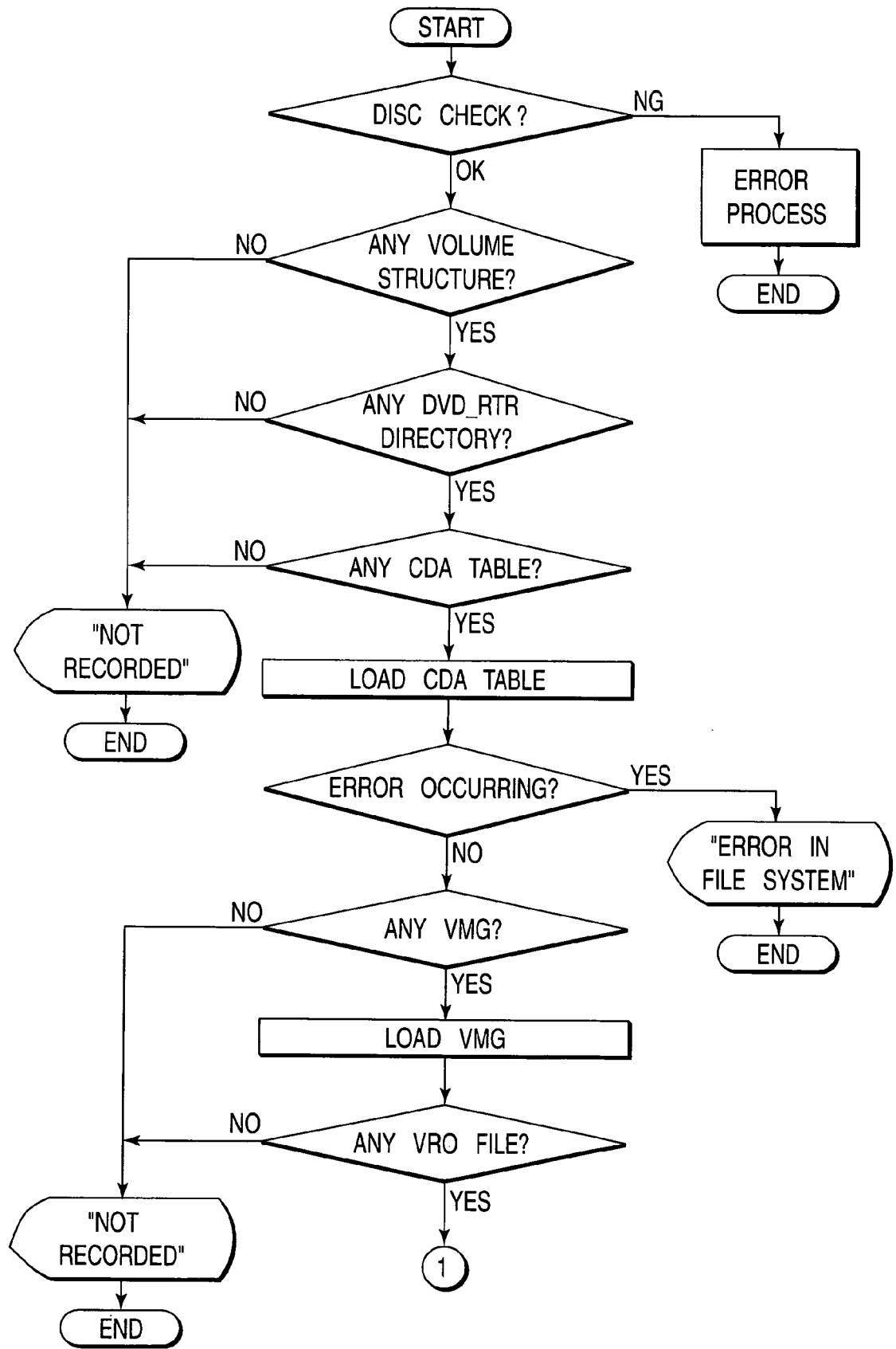
F I G. 21A

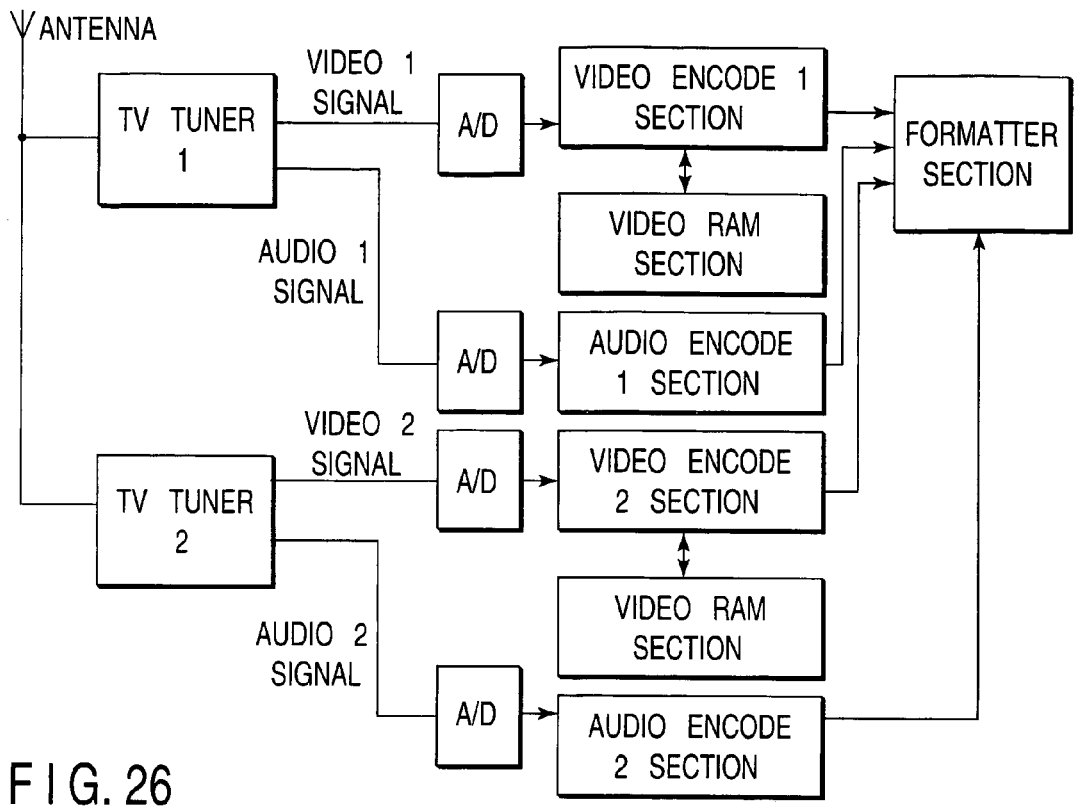
F I G. 26
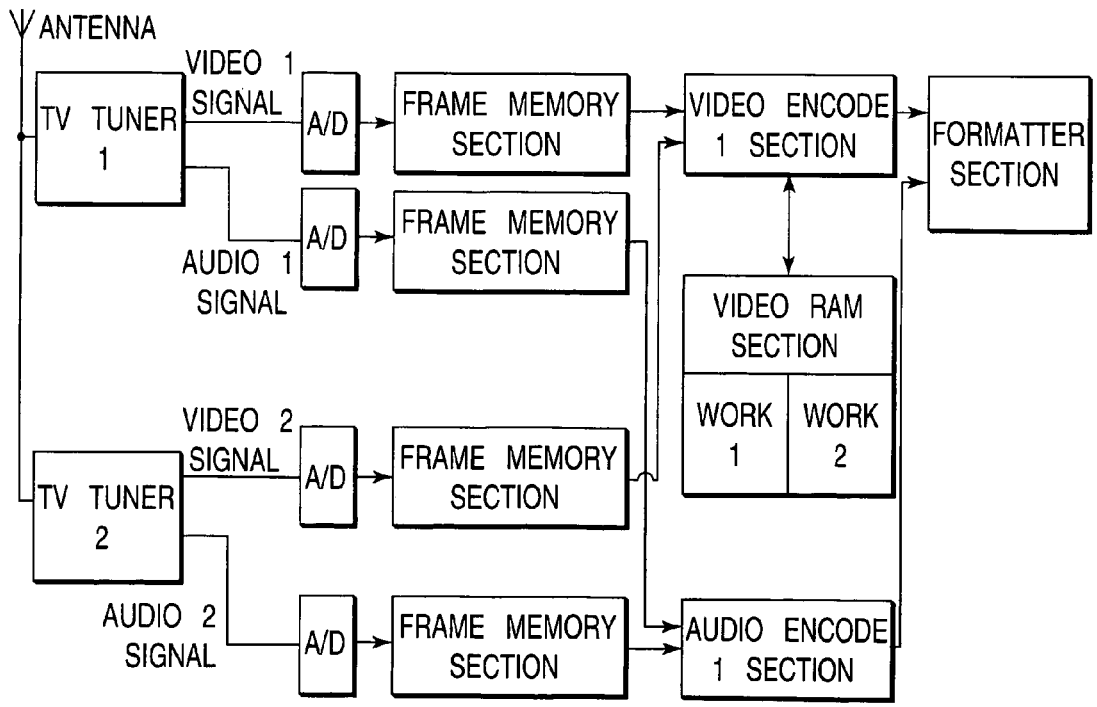
F I G. 27

MULTICHANNEL RECORDING DEVICE AND METHOD

CROSS-REFERENCE TO RELATED APPLICATIONS

This application is based upon and claims the benefit of priority from the prior Japanese Patent Application No. 11-242204, filed Aug. 27, 1999, the entire contents of which are incorporated herein by reference.

BACKGROUND OF THE INVENTION

The present invention relates to a multichannel recording device and method for simultaneously recording a plurality of programs on disc-like recording media such as RTR (Real Time Recorder)-DVDs (Digital Versatile Discs).

As is well known, optical disc reproducing devices for animations have been developed which reproduce optical discs having data such as videos and sounds recorded thereon. These optical disc reproducing devices are commonly used for movie software or karaoke to reproduce, for example, LDs (Laser Discs) or video CDs (Compact Discs).

The MPEG (Moving Picture Image Coding Experts Group) 2 system is now used as an international standard, and a DVD standard based on AC (Audio Compression)-3 audio compression system has been newly proposed.

The DVD standard employs the MPEG2 for an animation compression system in accordance with an MPEG2 system layer, supports AC-3 audio or MPEG audio for an audio compression system, and additionally includes sub-picture data for subtitles comprising run-length-compressed bit map data and control data (a navigation pack) for special reproduction such as fast forwarding and fast rewinding.

Further, the DVD standard supports the ISO (International Organization for Standardization) 9660 and the micro UDF (Universal Disc Format) in order to allow computers to read data.

Standards for DVD-ROMs (Read Only Memories), which are media used for DVD-videos, and for DVD-RAMs (Random Access Memories) [2.6 GB (Giga Bytes)] has also been completed; DVD-RAM drives are becoming more and more popular as computer peripheral devices.

Moreover, a RTR-DVD standard has been completed and commercialized, which is a DVD video standard that uses DVD-RAMs to enable real-time recording and reproduction.

The RTR-DVD standard is based on the currently commercially available DVD-video standard. A file system compatible with this RTR-DVD is also being designed.

This standard defines a minimum data length unit over which AV (Audio Video) data must be contiguously recorded in order to enable continuous reproduction despite a defect or a jump. This data length unit is called "CDA (Contiguous Data Area)".

The CDA blocks are limited in that they must be arranged contiguously on a disc and each have a length equal to an integral multiple of that of the ECC (Error Correcting Code) block. The CDA length varies with a recording rate. Basically, the amount of data must be such that data in a buffer can be continuously reproduced for a period of time longer than that required for a pickup to move from an inner-most periphery to an outer-most periphery of the disc.

Accordingly, the RTR-DVD specifies recording and reproducing processes using the CDA. Based on this standard, equipment will be developed which carries out recording and reproduction for TV (Television) broadcasting and which will replace the current VTRs (Video Tape Recorders).

In this case, one of the demands which has not been realized by the current VTRs will be met using disc media. That is, the disc media enable two or more TV programs to be simultaneously recorded.

The current RTR-DVD standard, however, does not assume that a plurality of programs are simultaneously recorded. As a result, it does not allow a plurality of programs to be recorded.

BRIEF SUMMARY OF THE INVENTION

The present invention is provided in view of these circumstances, and it is an object thereof to provide a multichannel recording device and method for enabling a plurality of programs to be simultaneously efficiently recorded on disc-shaped recording media.

A multichannel recording device and method according to the present invention is directed to recording of digital data constituting programs on a disc-shaped recording medium using a specified minimum data length unit over which data must be contiguously recorded. Digital data constituting a first and second programs that are mutually different are alternately recorded on a disc-shaped recording medium using the specified data length unit.

Alternatively, a multichannel recording device and method according to the present invention is directed to recording on a disc-shaped recording medium using a CDA unit. Digital data constituting a first and second programs that are mutually different are alternately recorded on a disc-shaped recording medium using the CDA unit.

According to the above described configuration and method, the digital data constituting the first and second programs that are mutually different are alternately recorded on the disc-shaped recording medium using the CDA unit, thereby enabling the plurality of programs to be simultaneously efficiently recorded on the disc-shaped recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view useful for explaining a VOBS hierarchical structure according to the embodiment;

FIG. 4 is a view useful for explaining a CDA table according to the embodiment;

FIGS. 21A and 21B are flow charts useful for explaining a reproducing operation according to the embodiment;

FIG. 26 is a block diagram useful for explaining another example of an encoder section according to the embodiment; and FIG. 27 is a block diagram useful for explaining a further example of an encoder section according to the embodiment.

DETAILED DESCRIPTION OF THE INVENTION

An embodiment of the present invention will be explained below with reference to the drawings. In DVD-videos, data are saved in a normal file format. Further, a title corresponds to, for example, one movie, and one disc contains a plurality of titles.

A collection of titles are called a "title set" that comprises a plurality of files. In addition, in the recording and reproducing DVD, one disc contains one animation VOBS (Video Object Set) file, and an original PGC (Program Chain) has a reproducing order recorded thereon which is used to reproduce data in the order that they have been recorded.

Figure 1:
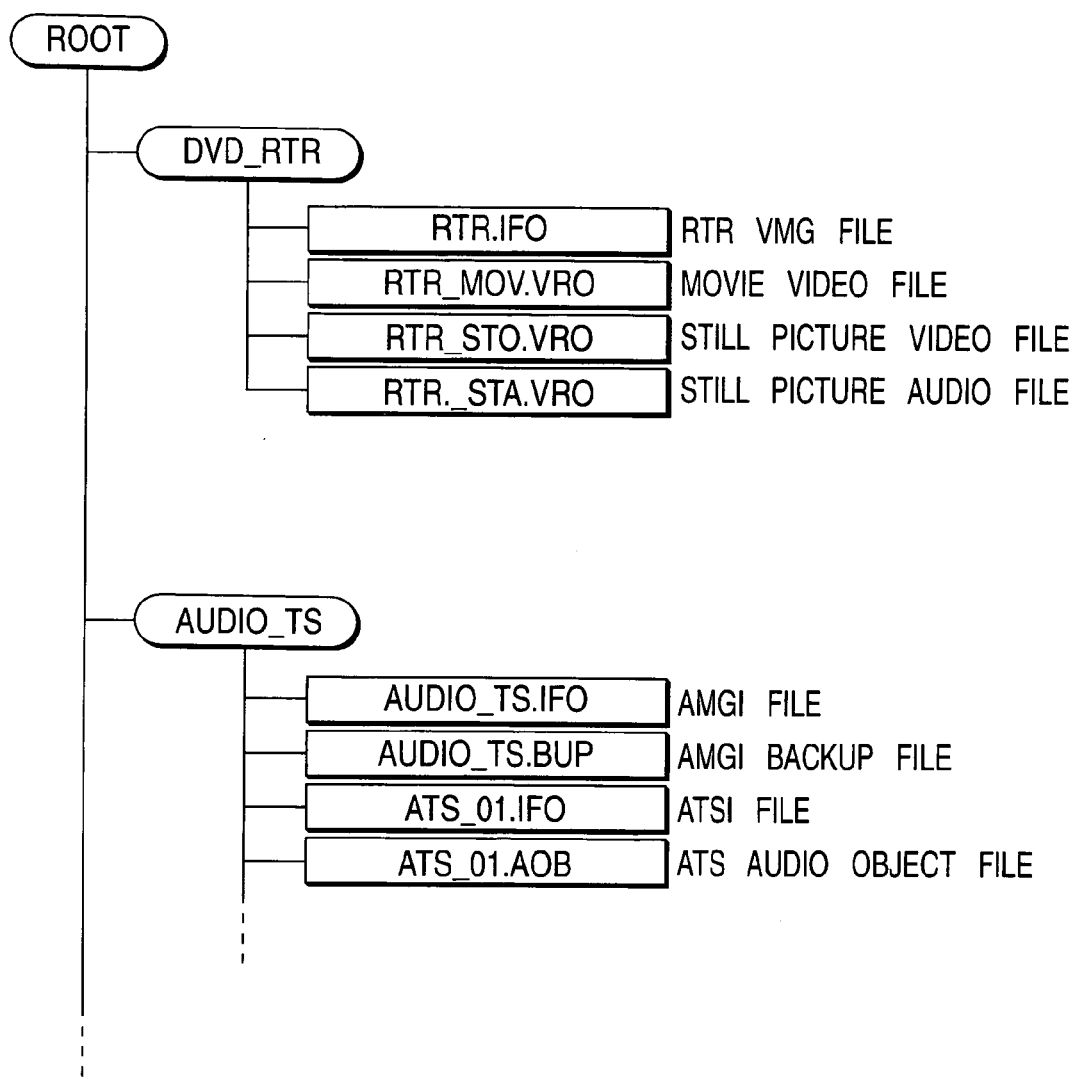
FIG. 1 is a view showing an embodiment of a multichannel recording device and method according to the present invention, the view being useful for explaining an RTR-DVD directory structure.

In addition, in the DVD, different directories are provided for corresponding standards: a VIDEO_TS is provided for the DVD-video, an AUDIO_TS is provided for the DVD-audio, and a DVD-RTR is provided for the recording and reproducing DVD as shown in FIG. 1. Each recording data is present in one of these directories.

Further, in the DVD video, one disc has a file called "VMG" as information for managing this disc.

Additionally, the title set (hereafter referred to as "VTS") contains information for managing this VTS. This information comprises management information file for VTS information VTSI, a video file including video data, and a VTSI backup file.

For recording and reproducing standards, the VMG management information VGMI and the VTSI are combined into a VMG to manage video data file.

Figure 2:
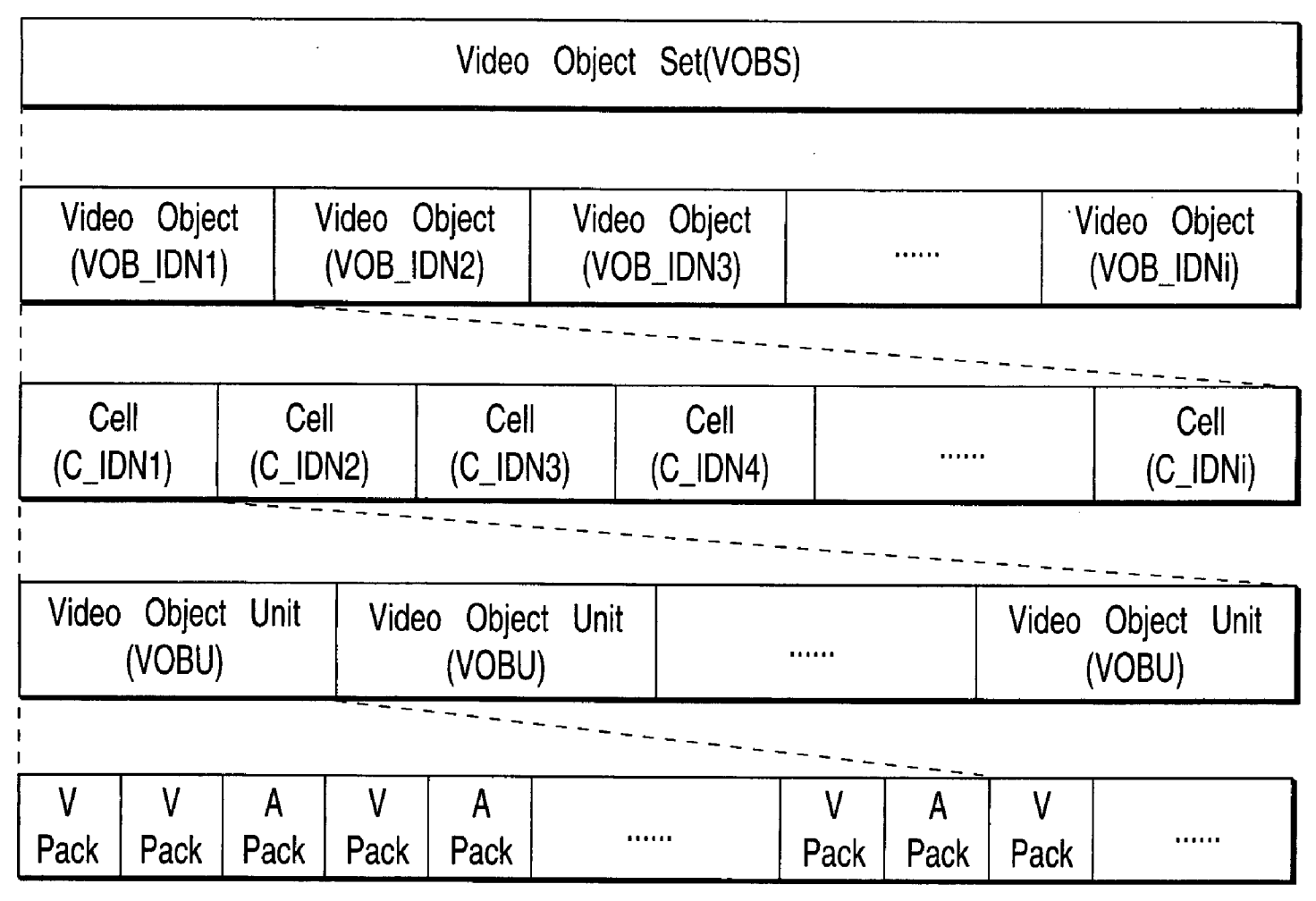

A video file is managed using a hierarchical structure as shown in FIG. 2. One VOBS comprises a plurality of VOBs (Video Objects) and one VOB comprises a plurality of VOBUs (Video Object Units).

Additionally, the VOBU comprises a pack including a plurality of various data. One pack comprises one or more packets and packet headers, and each video data and audio data are recorded in these packets.

The pack is a minimum unit for data transfer processes. Further, a minimum unit for logical processes is a cell: that is, logical processes are carried out using a cell unit. The order in which data are reproduced is defined by the PGC. The PGC has a plurality of programs PGs registered therein. Each PGs has cells registered in it.

The cell has registered therein the number of a VOB to be reproduced and the amount of time required to reproduce the VOB so that the VOB is reproduced in accordance with the cell reproduction information.

The PGC information PGCI actually has the structure of the PGC recorded thereon. A reproducing process is carried out in accordance with the PGCI, and the PGCI is created during recording or reproduction.

In addition, in the recording and reproducing DVD, the special PGC for reproducing data in the order that they have been recorded is called the "original PGC", and information on the original PGC is recorded in ORG_PGCI. Further, a PGC created through edition or the like is called a "user-defined PGC", and information on the user-defined PGC is recorded in UD_PGCI.

As described above, one disc contains one ORG_PGC and a plurality of UD_PGCs.

Figure 3:
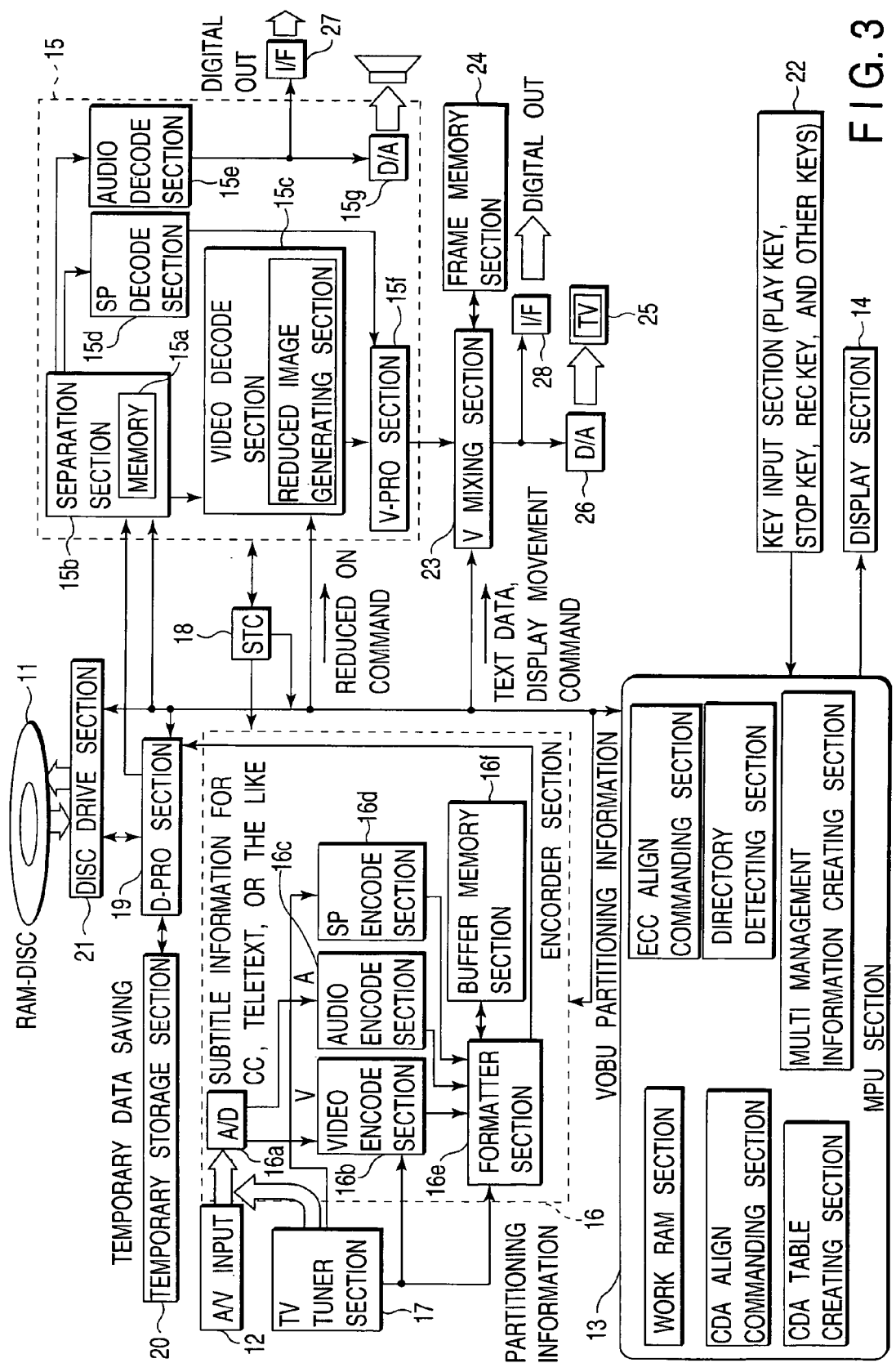
FIG. 3 is a block diagram useful for explaining a recording and reproducing apparatus according to the embodiment.

FIG. 3 shows a recording and reproducing device for recording and reproducing data on and from an optical disc 11. The recording and reproducing device essentially comprises an A/V (Audio/Video) input section 12, an MPU (Microprocessing Unit) section 13, a display section 14, a decoder section 15, an encoder section 16, a TV tuner section 17, an STC (System Time Clock) section 18, a D (Data)-PRO (Processor) section 19, a temporary storage section 20, a disc drive section 21, a key input section 22, a V (Video) mixing section 23, a frame memory section 24, a D/A (Digital/Analogue) conversion section 26 for a TV receiver 25, and I/F (Inter/Face) sections 27 and 28 for digital outputs.

The encoder section 16 comprises an A/D (Analogue/Digital) conversion section 16a, a video encode section 16b, an audio encode section 16c, an SP (Sub Picture) encode section 16d, a formatter section 16e, and a buffer memory section 16f.

The decoder section 15 comprises a separation section 15b having a built-in memory 15a, a video decode section 15c, an SP decode section 15d, an audio decode section 15e, a V-PRO section 15f, and a D/A conversion section 15g for a speaker 29.

The flow of video signals is will be described below. First, an input A/V signal is converted into digital data by the A/D conversion section 16a. The digital data are supplied to the encode sections 16b, 16c, and 16d.

That is, the video data are input to the video encode section 16b, where they are MPEG-compressed. Audio data are input to the audio encode section 16c, where they are AC-3 compressed or MPEG-audio-compressed. Character data such as these for teletext are input to the SP encode section 16d, where they are run-length-compressed.

Furthermore, in packing the compressed data, the encode sections 16b, 16c, and 16d carry out such packetization that one pack comprises 2,048 bytes and then output the packet to the formatter section 16e. The formatter section 16e packs and multiplexes each packet and outputs packs to the D-PRO section 19 whenever it has obtained an amount of packets corresponding to one CDA.

In addition, in this case, for example, the data are separated in such a manner that one GOP (Group of Pictures) constitutes the VOBU, and this partitioning information is saved to the buffer memory section 16f. Once a fixed amount of partitioning information has been accumulated, it is transferred to the MPU section 13, which then creates time-map information based on the partitioning information (the time-map information is sent upon a GOP leading interrupt or the like).

The partitioning information (VOBU information) may include the size of the VOBU, the amount of time required to reproduce the VOBU from its leading position to its end, an end address of an I picture, that is, intraframe coding information relative to the leading position of the VOBU, and the like. Alternatively, the formatter section 16e directly creates time-map information based on the partitioning information and passes it to the MPU section 13 in the form of TMAP.

The D-PRO section 19 forms an ECC block for each set of 16 packs and adds error correction data thereto, and the disc drive section 21 records the ECC block with the error correction data on the optical disc 11. If the disc drive section 21 is busy due to seeking, a track jump, or the like, the ECC block is placed in the temporary storage section 20 and wait for the disc drive section 21 to get ready. In addition, in the recording and reproducing DVD, one disc contains one video file.

It should be noted that a real-time recording and reproducing device using the DVD requires a minimum amount of contiguous sectors to continue reproduction without interruption during an access (seek) for accessing animation reproduction data.

This unit is called the "CDA". The CDA is limited to ECC block units. Thus, a file system has a table for managing the CDA, as shown in FIG. 4.

In the CDA table, the size of the CDA is a multiple of 16 sectors and is represented by the number of ECC blocks.

Further, in an initial state, the start address of an effective data area within a zone equals the start address of a leading CDA within the zone. In FIG. 4, the CDA size is 3,564 sectors: 7 MB (Mega Bytes).

The CDA table has each CDA start address, the corresponding CDA size, and the next CDA number recorded therein. The last used CDA has "0xffff (end code" recorded in the next CDA number section. It should be noted that "0x00" is stored in the storage area for the next CDA number at the initialing of the CDA table.

Further, 7 bytes of "0xff" are provided at the end of the CDA table as an end code. The first CDA, however, must have recording areas for the file system, the VMG data, and the like which each comprise 16 sectors.

Alternatively, if the disc is not in the initial state (the disc has fixed data recorded thereon), the leading position of the zone does not necessarily equal the start address of the leading CDA within the zone because the CDA is configured in an unused area.

The start address of the leading CDA, however, is determined to be an address relative to the leading position of the zone and which corresponds to a multiple of 16 sectors in an empty area. Thus, the leading position of the ECC block can be matched with the leading position of the CDA.

Further, the CDA number of the first CDA recorded and the number of data used by the last CDA are recorded after the CDA table. Thus, the next CDA can be recorded next to the sector used by the last CDA.

In addition, to manage video data, the VMG has recorded therein M_AVFITI (Movie AV File Information Table Information) and PGCI for controlling the reproducing order. The file system has a reserved CDA table as an AV-exclusive file extent for managing data using the CDA unit.

The ORG_PGCI creates TMAPI (Time Map Information) in M_AVFITI based on the partitioning information and sets PGCI in the order of recording to reflect the contents recorded in the CDA table using the CDA unit.

Figure 5:
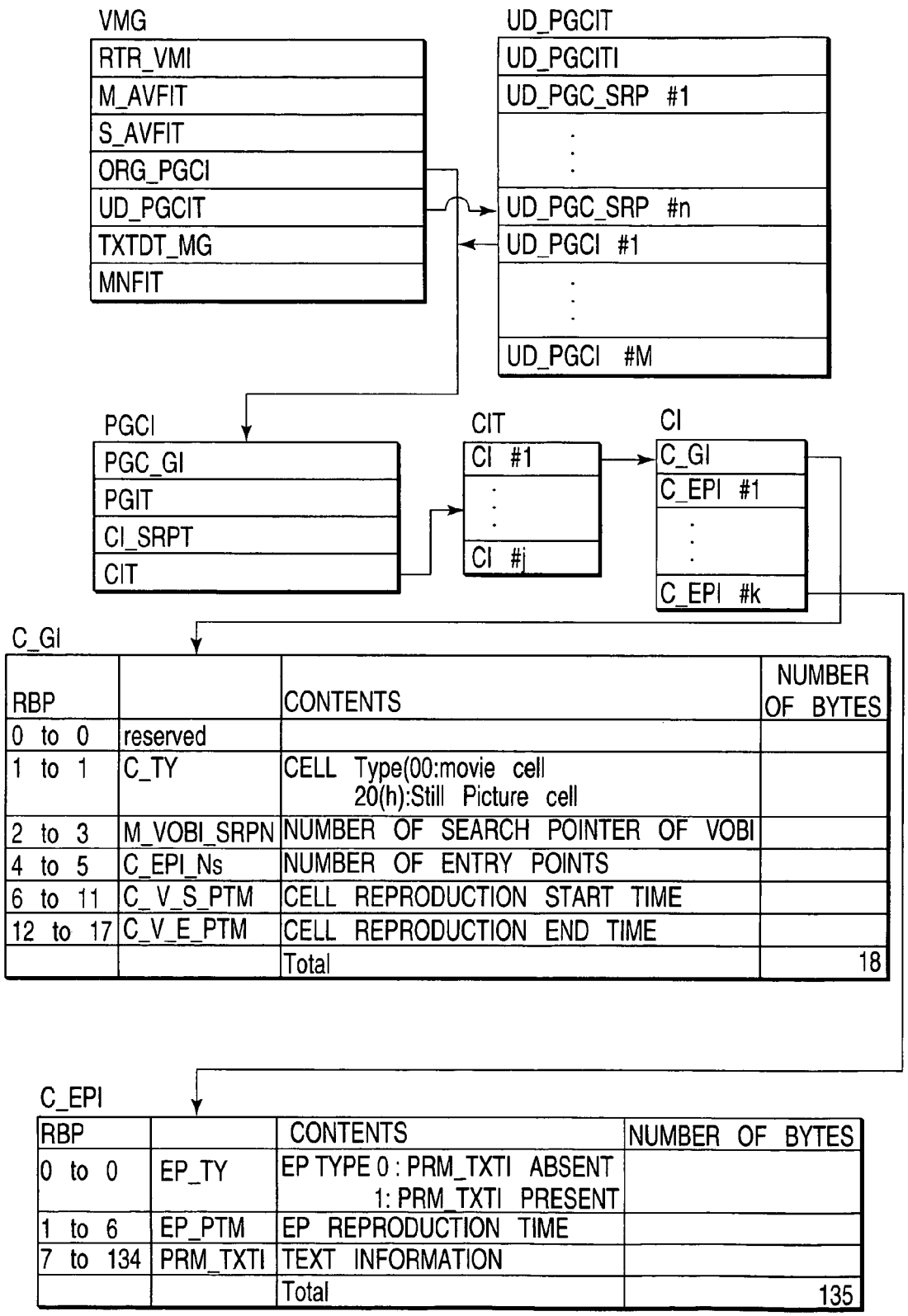
FIG. 5 is a view useful for explaining a C_EPI table according to the embodiment.

The PGCI is included in the VMG as shown in FIG. 5. Additionally, the PGCI comprises PGC_GI (including the number of PGs and cells included in the PGC), PGIT [a PG type: protection/non-protection, the number of cells in the PG, primary text information, an SRP (Search Pointer) number into an item text, and a thumb-nail pointer], CI_S-RPT (a cell search pointer table), and CIT (a cell information table).

Further, the CIT comprises CI#1 to #j, and the CI comprises C_GI (a cell type, a search pointer into VOB information VOBI: the number of a VOB in a cell to be reproduced, and a cell reproduction start time and end time) and C_EPI#1 to #k [an EP (Entry Point) type (with or without text information), the amount of time required to reproduce the EP, and text information].

Figure 6:
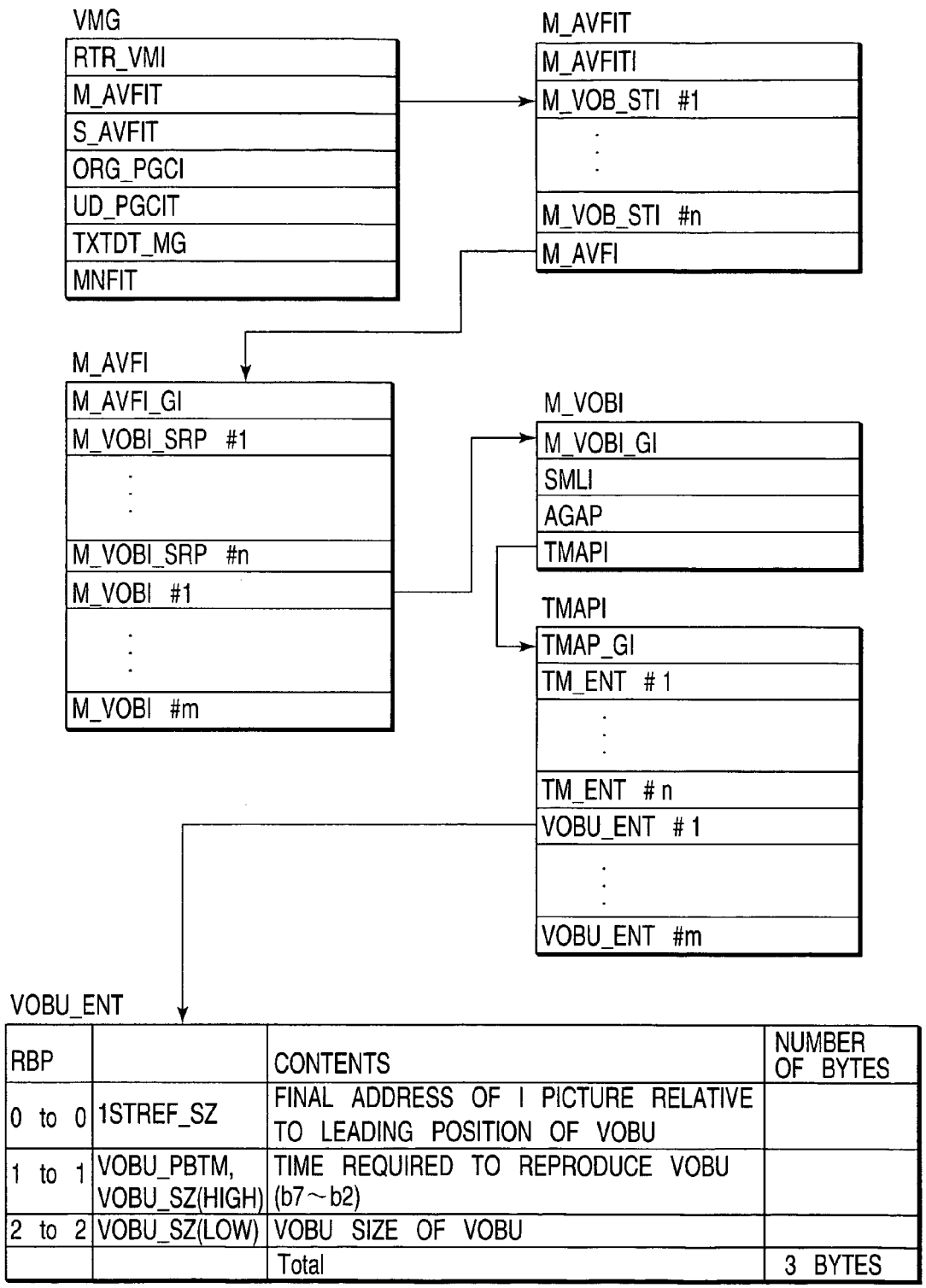
FIG. 6 is a view useful for explaining a VOBU_ENT table according to the embodiment.

Next, M_VOBI is included in the VMG as information for reproducing the VOB, as shown in FIG. 6. The M_VOBI includes TMAPI, which comprises TMAP_GI (the number of TMUs, the number of VOBU_ENTS, a time offset, and an address offset: a file pointer of the VOB within the video file relative to its leading position), TM_ENT#1 to #n (a VOBU_ENT number detected every 10 seconds, a time difference, and a VOBU address: a file pointer of the VOBU within the video file relative to its leading position), and VOBU_ENT#1 to #m (relative addresses from a leading position of the VOBU to the last data of an I picture, the amount of time required to reproduce the VOBU, and the size of the VOBU).

In addition, in recording data using the CDA unit, two manners for aligning CDAs are possible as a process executed to complete recording.

First, when recording is finished and if data end before the CDA has been completed and the end point is located in the middle of the ECC block, a dummy pack is recorded until the ECC block is finished, thereby completing the ECC block. The dummy pack is composed of dummy packets that are defined in the MPEG system layer.

Second, when recording is finished and if data end before the CDA has been completed, the dummy pack is recorded until the CDA is finished, thereby completing the CDA block. Alternatively, in this second method, the CDA length may be changed to avoid the dummy. In this case, the subsequent CDAs may be repartitioned.

Figure 7A:
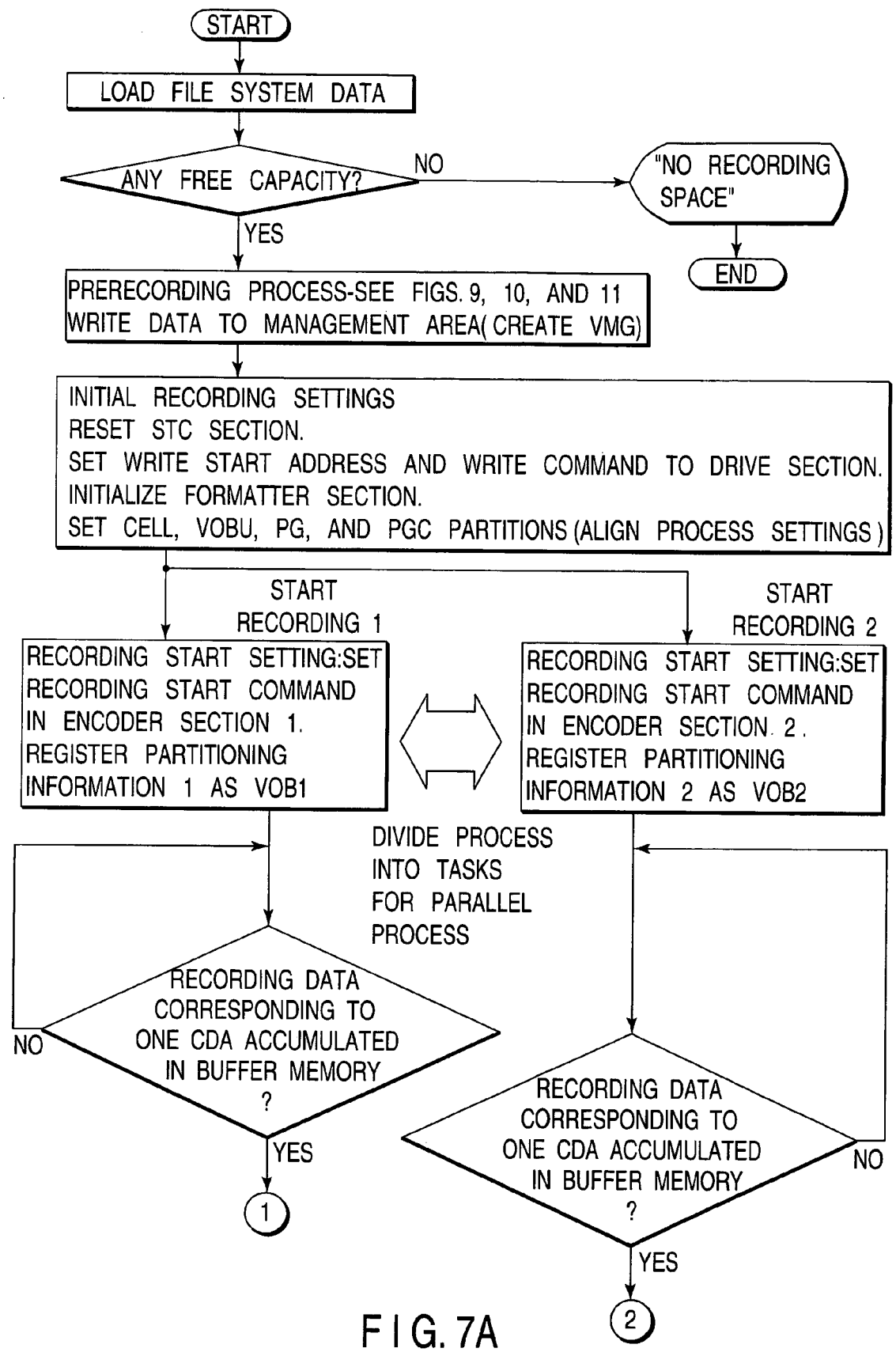
FIGS. 7A and 7B are flow charts useful for explaining a video recording operation according to the embodiment.
Figure 7B:
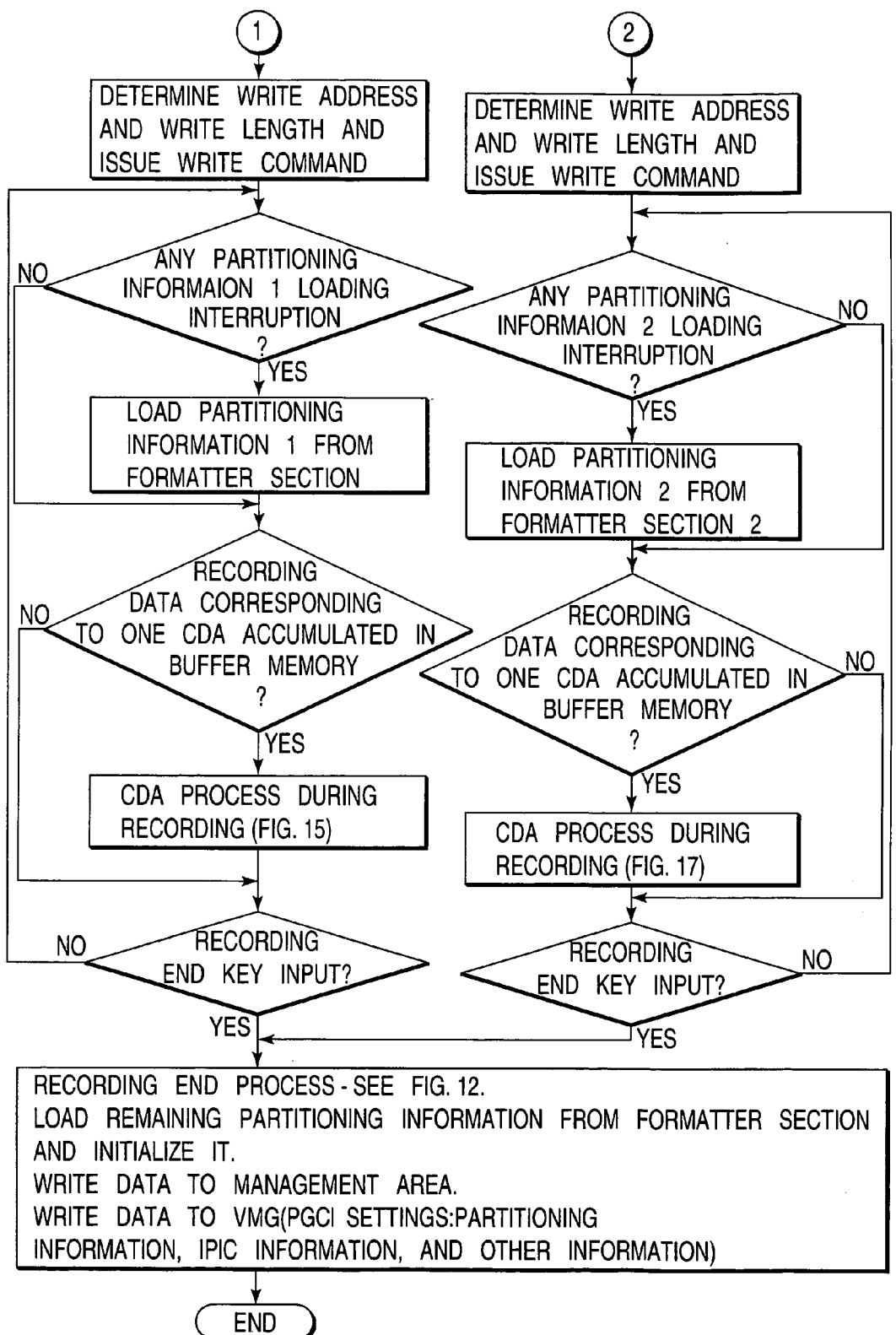
Figure 8:
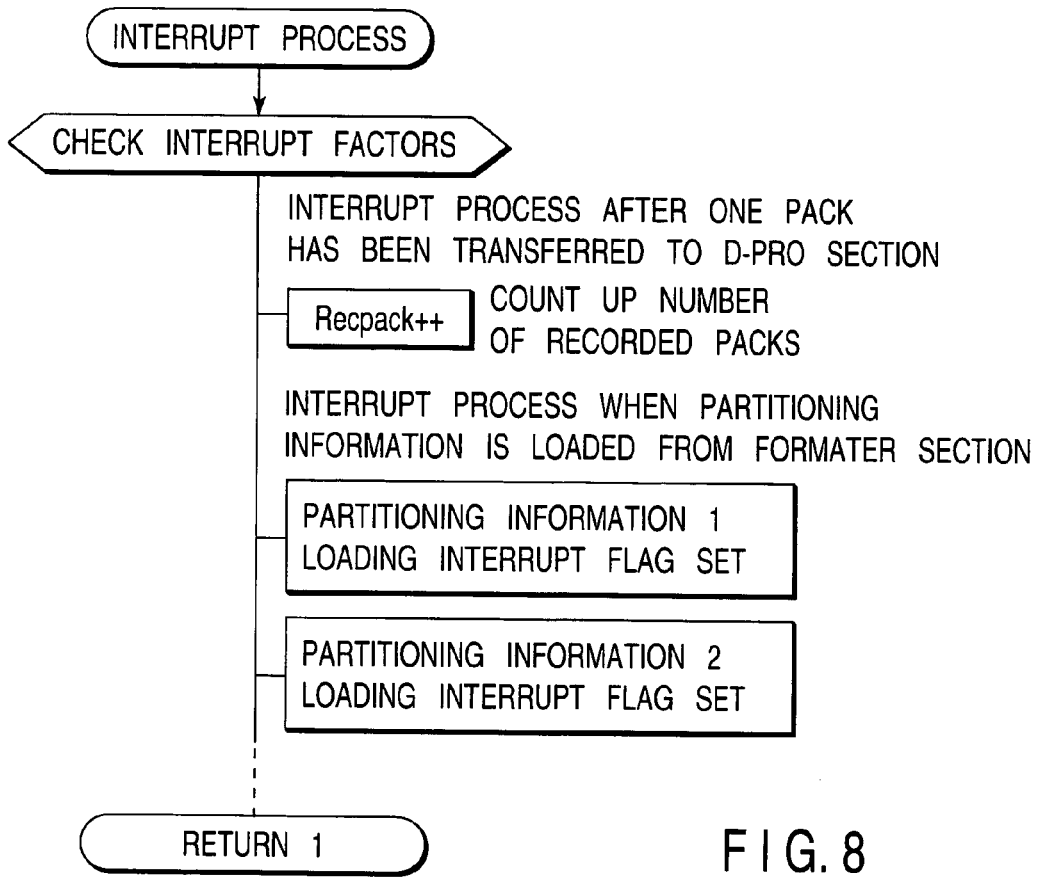
FIG. 8 is a flow chart useful for explaining an interrupt operation during recording according to the embodiment.

How two programs are recorded will be described below with reference to the flow charts shown in FIGS. 7A, 7B, and 8.

1. File system data are read, and it is checked whether there is a free capacity. If not, this is displayed and the process is ended.

2. If there is a free capacity, a pre-recording process, described later, is carried out to determine write addresses.

3. Initial recording settings are made for the encoder section 16. Then, partitioning conditions for PGs, cells, and VOBUs are set in the formatter section 16e so that the formatter section 16e automatically carries out partitioning. In addition, if the above described align process is to be carried out, this is also set in the formatter section 16e.

4. The processing in the following 5 to 11 is partitioned into tasks, which are then processed in parallel for each program.

5. A recording start command is set in the encoder section 16.

6. Once an amount of data corresponding to one CDA has been accumulated in the buffer memory section 16f, write addresses, a write length, and a write command are issued to the disc drive section 21.

7. It is checked whether the partitioning information has been accumulated, and if so, the formatter section 16e reads the information.

8. It is checked whether an amount of data corresponding to one CDA has been accumulated in the buffer memory section 16f, and if not, the process shifts to processing in 10.

9. If an amount of data corresponding to one CDA has been accumulated, a CDA process during recording is carried out to issue recording addresses, a recording length, and a record command are issued to the disc drive section 21.

10. It is checked whether a key has been operated to end recording. If a stop key has been input, the process shifts to processing in 12.

11. The process shifts to the processing in 6.

12. A recording end process, described later, is carried out.

Figure 9:
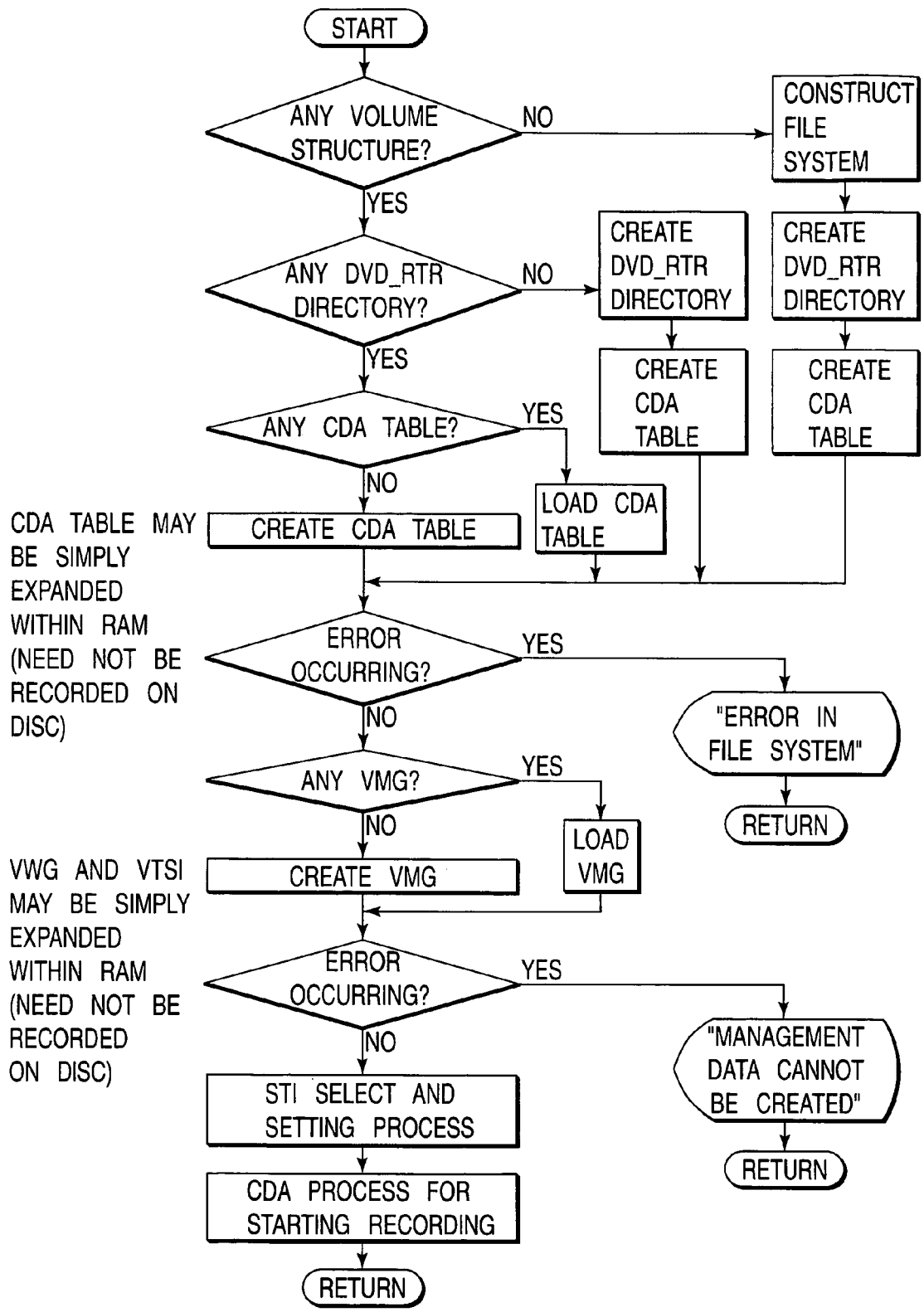
FIG. 9 is a flow chart useful for explaining a process operation before recording according to the embodiment.

A process carried out at the start of recording will be explained below with reference to the flow chart in FIG. 9.

1. It is checked whether there is a file system. If not, a file system and a DVD_RTR directory are constructed and a free file extent is checked to create a CDA table (see FIG. 4). Then, the process shifts to the processing in 4. The constructed CDA table in the initial state may be saved to an area of the optical disc 11 which is specified by the file system. Even if it is not saved at this point, a CDA table that has been updated so as to reflect the contents of recorded data may be saved when recording is ended.

2. The directory is checked, and if there is no DVD_RTR directory, one is created and a CDA table is created. The process then shifts to processing in 4.

3. The CDA table is checked, and if there is no CDA table, one is constructed in a work RAM of the MPU section 13.

4. An error check is carried out, and if an error is found during the above described process, the expression "error in file system" is displayed. Then, the process is ended.

5. It is checked whether there is a VMG in the optical disc 11. If not, a VMG table is constructed in the work RAM, and if there is a VMG in the optical disc 11, the VMG table is read from the optical disc 11 and expanded in the work RAM of the MPU section 13. The constructed VMG in the initial state may be saved to an area of the optical disc 11 which is specified by the file system. Even if it is not saved at this point, a VMG that has been updated so as to reflect the contents of recorded data may be saved when recording is ended.

6. An error check is carried out, and if an error is found, the expression "management data cannot be created" is displayed. Then, the process is ended.

7. A CDA process, which is performed at the start of recording as will be described later in detail is executed, and encoding attribute information (STI) for recording is selected and set to complete the present process. The STI information, however, may be set before recording or after the recording has been completed. The method for setting the STI information before recording will be described below.

Figure 10:
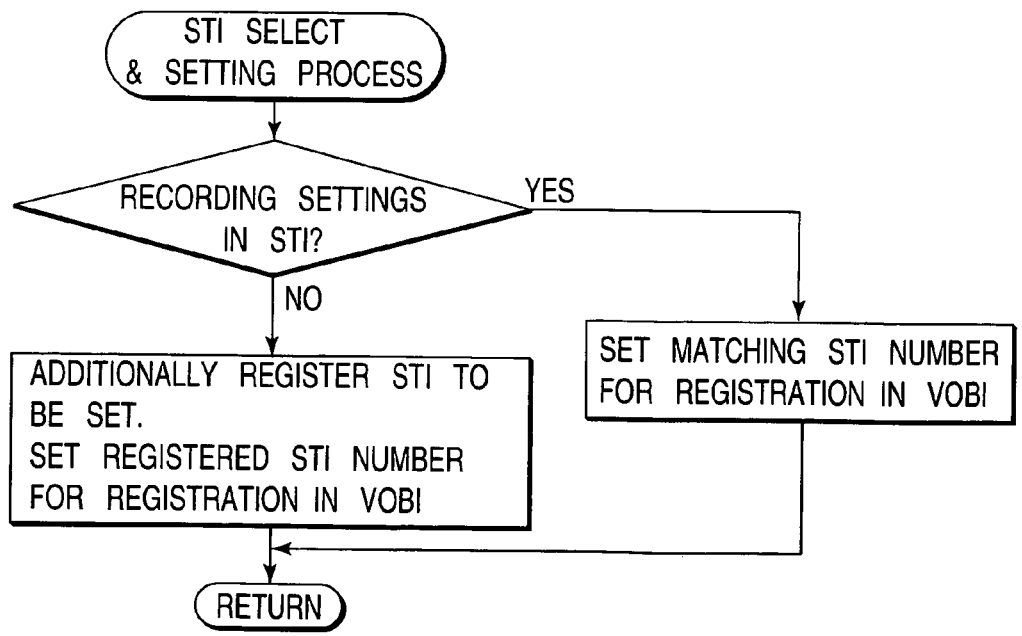
FIG. 10 is a flow chart useful for explaining an STI selection and setting process operation according to the embodiment.

Further, in the process for selecting or setting the encoding attribute information (STI) for recording, attribute information to be recorded is compared with the STI information in the VMG recorded in the optical disc 11 as shown in FIG. 10. If the same information is found, the corresponding STI number is saved to the work RAM and used for VOBs during recording. Otherwise, STI information is constructed using the attribute information recorded in the STI information and is then added to the STI information in the VMG. The number of the added STI is saved to the work RAM and used for VOBs during recording.

The STI information refers to attribute information for encoding and comprises a video resolution, a selection between NTSC and PAL, an aspect ratio, the number of audio streams, the number of SP streams, an audio stream coding method, a sampling frequency, the number of channels, an audio bit rate, and other information.

To construct a CDA table, the CDA length must be varied depending on a recording rate, an average seek time required by the disc drive section 21, or the like and cannot be simply determined. The CDA table must have a sufficient capacity to continue reproduction at least for a period of time from an access to an inner-most periphery of the optical disc 11 until an outer-most periphery thereof is accessed+an amount of time α.

The CDA length, however, is represented by the number of ECC blocks and thus equals a multiple of 16 sectors. In addition, the CDA table may have the CDA start address, the CDA length (which can be represented by the number of sectors, the number of ECC blocks, or the end address), the next CDA number, the first starting CDA number, and other information recorded therein.

Additionally, three timings are possible for the process before recording.

First, the process is carried out immediately after the optical disc 11 has been inserted. This method has the advantage of being able to start recording immediately after a record key has been pressed but requires an excess amount of time for preparations when the optical disc 11 is inserted.

Second, the process is carried out when a format key is pressed. With this method, however, the format key must be pressed whenever recording is to be started.

Third, the process is carried out when recording is started. With this method, however, there is a small amount of time lag after the record key has been pressed and before the recording is started. During this period data must be saved to the temporary storage section 20.

In addition, as shown in the above described flow chart, if there is already a CDA table, this table is used to record data after previously recorded data. For a refresh operation, all files must be deleted and the initial CDAs must be overwritten without checking the CDA table (if the refresh key or the like has been pressed).

Figure 11:
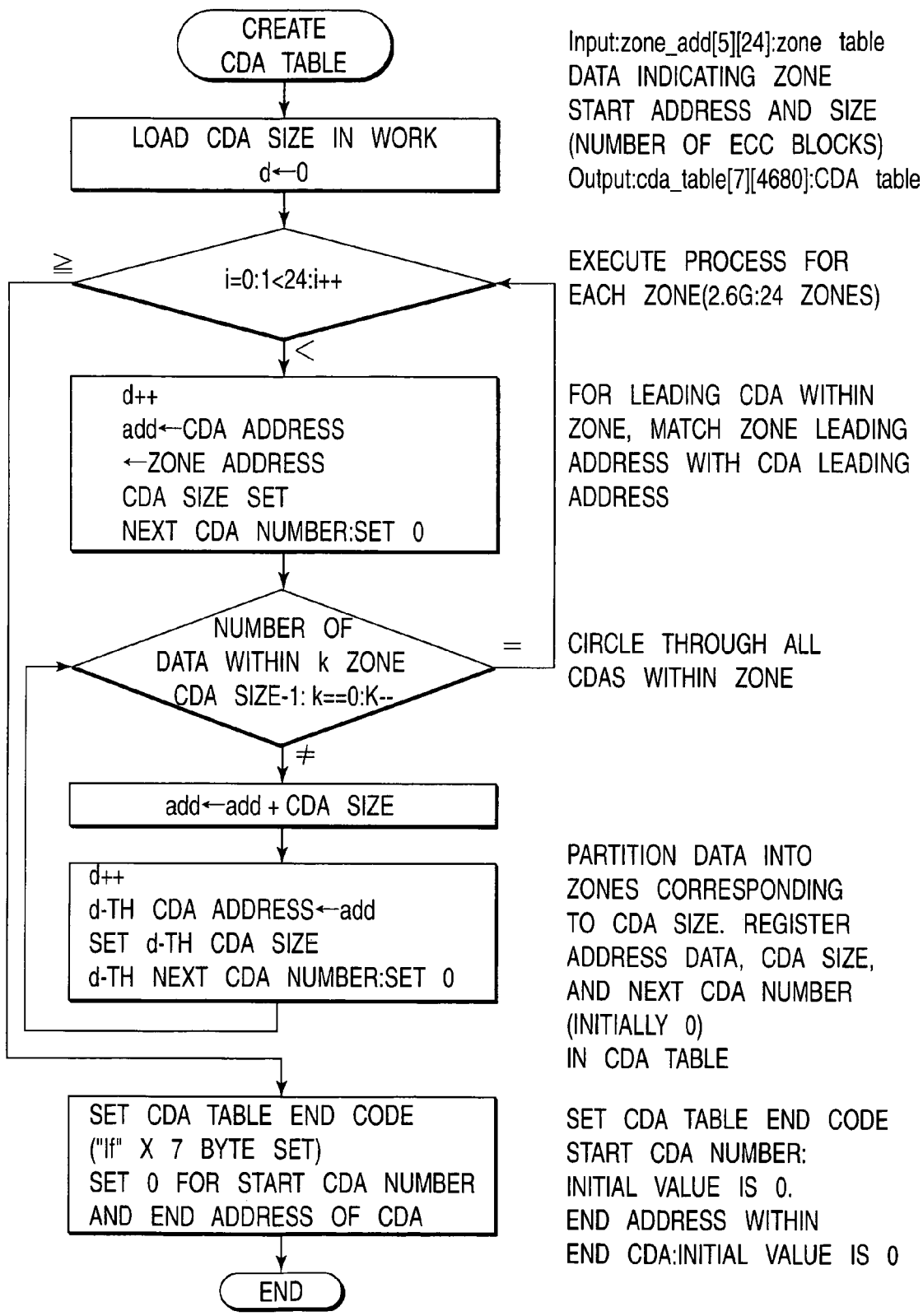
FIG. 11 is a flow chart useful for explaining an initial CDA table creation process operation according to the embodiment.

Moreover, a process for creating an initial CDA (there is no file and the optical disc 11 contains no CDA table) table will be described with reference to the flow chart in FIG. 11. This table, however, requires data effective start addresses for each zone and data on data effective zone sizes. These are already determined for each type of recording media, and a table for 2.6-G DVD-RAMs is used in this embodiment.

The zone will be described before explaining the flow chart in FIG. 11. The DVD-RAM disc uses a zone CLV (Constant Linear Velocity) method. This method comprises partitioning the optical disc 11 into zones and maintaining a constant linear velocity within each zone for recording or reproduction.

The disc drive section 21 must change the rotation speed of the optical disc 11 each time it passes the zone. Thus, if a pause between the zones is within the CDA, continuous reading may not be guaranteed. Accordingly, by partitioning the data into CDAs so as not to extend over the two zones, stable readouts are guaranteed within the CDA.

1. A determined CDA size is loaded in the work RAM of the MPU section 13, and 0 is loaded in d (the number of CDAs).

2. Preparations are made to repeat the following process a number of times corresponding to the number of zones (while i=0 to 23, processing between 2 and 6 is repeated).

3. d is incremented, the zone start address is set equal to the start address of a d-th CDA, the CDA size is set equal to the size loaded in the work RAM, and the next CDA number is set at 0. Further, the zone start address is loaded in add.

4. Preparations are made to repeat the following process a number of times corresponding to (the number of packs within the zone÷the CDA size−1) (while k=the number of packs within the zone÷the CDA size−1, processing in 5 and 6 is repeated).

5. The add+the CDA size is saved to the add.

6. d is incremented, the value of the add is set equal to the start address of the d-th CDA, the CDA size is set equal to the size loaded in the work RAM, and the next CDA number is set at 0.

7. Seven bytes of encoding "−0xff" are recorded in the d+1-th section of the CDA table, and "0x0000" is saved after these bytes as a start CDA number and a final recording address within an end CDA.

Figure 12:
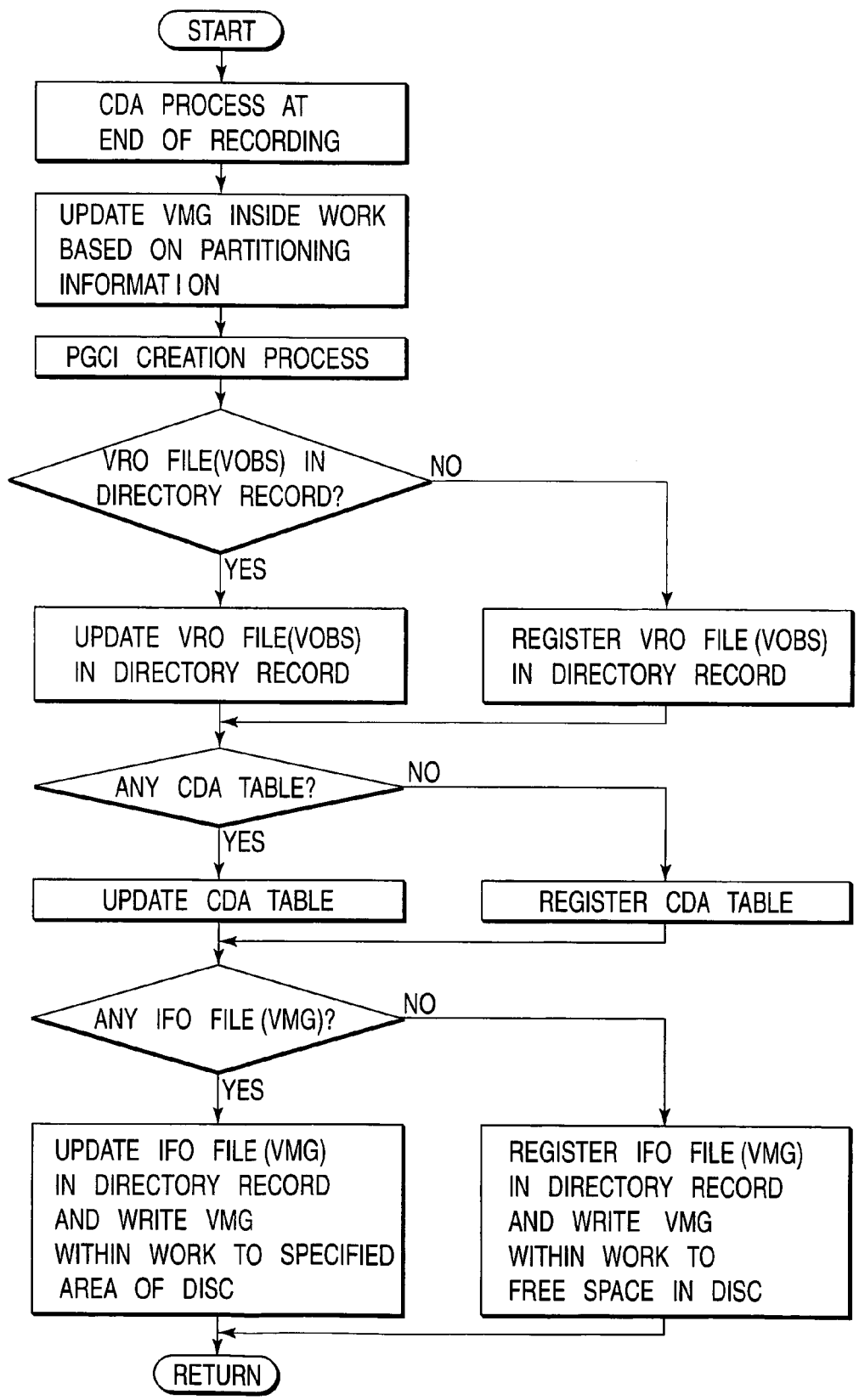
FIG. 12 is a flow chart useful for explaining a process operation after recording according to the embodiment.

Further, a process operation at the end of recording will be described with reference to the flow chart in FIG. 12.

1. The CDA process at the end of recording is carried out.

2. The VMGs in the work RAM are updated based on the partitioning information received from the formatter section 16*e*.

3. A PGCI is created which determines the order in which the data are reproduced.

4. It is checked whether there is a VOBS file (a VRO file) in directory record information below the RTR_DVD directory in the file system. If a VOBS file is found, the information in the VRO file (information in the recorded video file) is updated. If there is no VOBS file, directory record information for a VRO file is added to the directory (to the information in the recorded video file).

5. It is checked whether there is a CDA table. If no CDA table is found, the CDA table in the work RAM is recorded at a position specified by the file system. If a CDA table is found, this table is updated to one constructed in the work RAM.

6. It is checked whether there is an IFO file (a VMG file) in directory record information below the RTR_DVD directory. If no IFO file is found, VMGs constructed in the work RAM are recorded in a free space and information for an IFO file is added to the directory record information below the RTR_DVD directory. If an IFO file is found, the IFO data at the IFO file are updated based on the VMG data in the work RAM, and the directory record information below the RTR_DVD directory is updated.

Moreover, a normal PGCI creation process will be described below.

1. A recorded VOB is registered in a cell.

2. The cell in the ORG_PGCI is registered and the created cell is assigned to a program.

Figure 13:
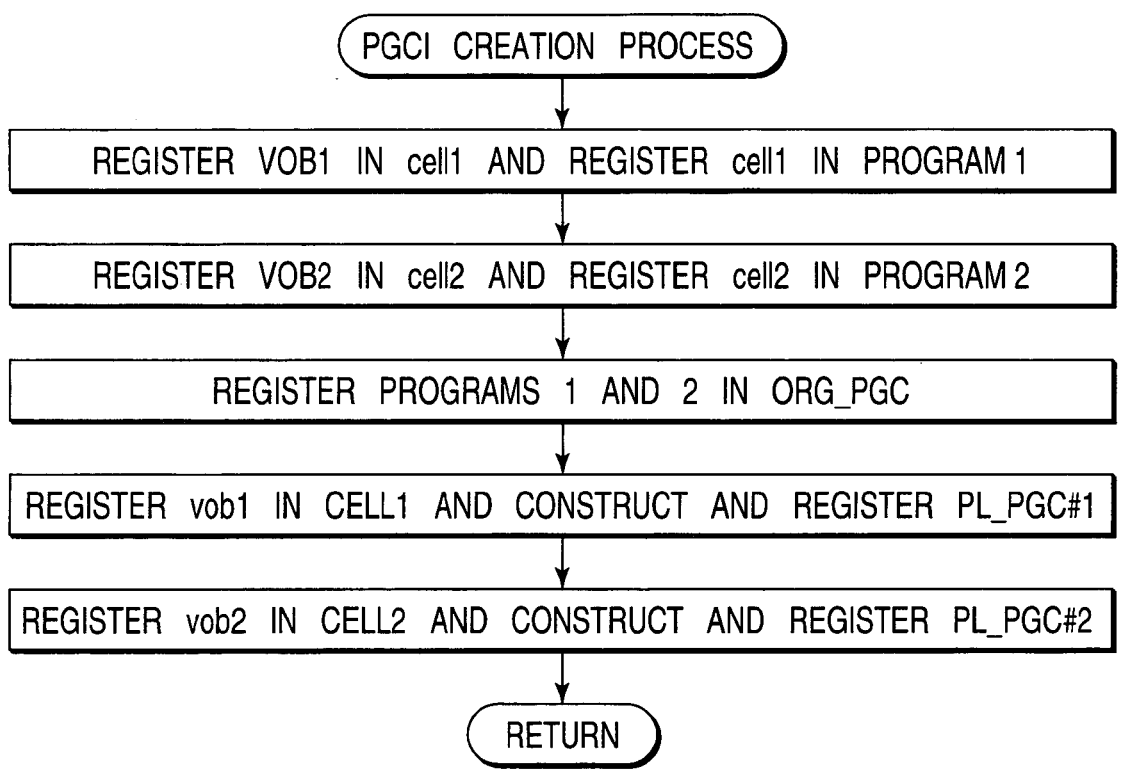
FIG. 13 is a flow chart useful for explaining a PGCI creation operation performed at the end of recording according to the embodiment.

Further, a PGCI creation process for recording two programs according to this embodiment is as shown in FIG. 13.

1. A recorded VOB1 (a VOB resulting from a recording process 1) is registered as a cell 1.

2. A recorded VOB2 (a VOB resulting from a recording process 2) is registered as a cell 2.

3. The cells 1 and 2 are registered in the ORG_PGCI as programs 1 and 2, respectively.

4. The VOB1 is registered in a cell of PL (Play List= UD)_PGCI#1 to constitute a PL_PGCI#1.

5. The VOB2 is registered in a cell of PL_PGCI#2 to constitute a PL_PGCI#2.

Consequently, if the data are to be entirely reproduced in the recording order, the ORG_PGC is selected for reproduction. If the programs are to be individually reproduced, the corresponding PL_PGC is selected for reproduction.

The VOBs are basically numbered in such a manner that smaller numbers are assigned to VOBs recording of which are started earlier. This is because the ORG_PGC is in the recording order. If VOBs have the same recording start time, the numbers for channels for the programs, the alphabetical order of the program titles, or the like can be used for the selection.

Additionally, since the PL_PGC has no defined rule for the order, the time at which recording of the program is started, the numbers for the channels for the programs, the alphabetical order of the program titles, or their combination can be used.

Figure 14:
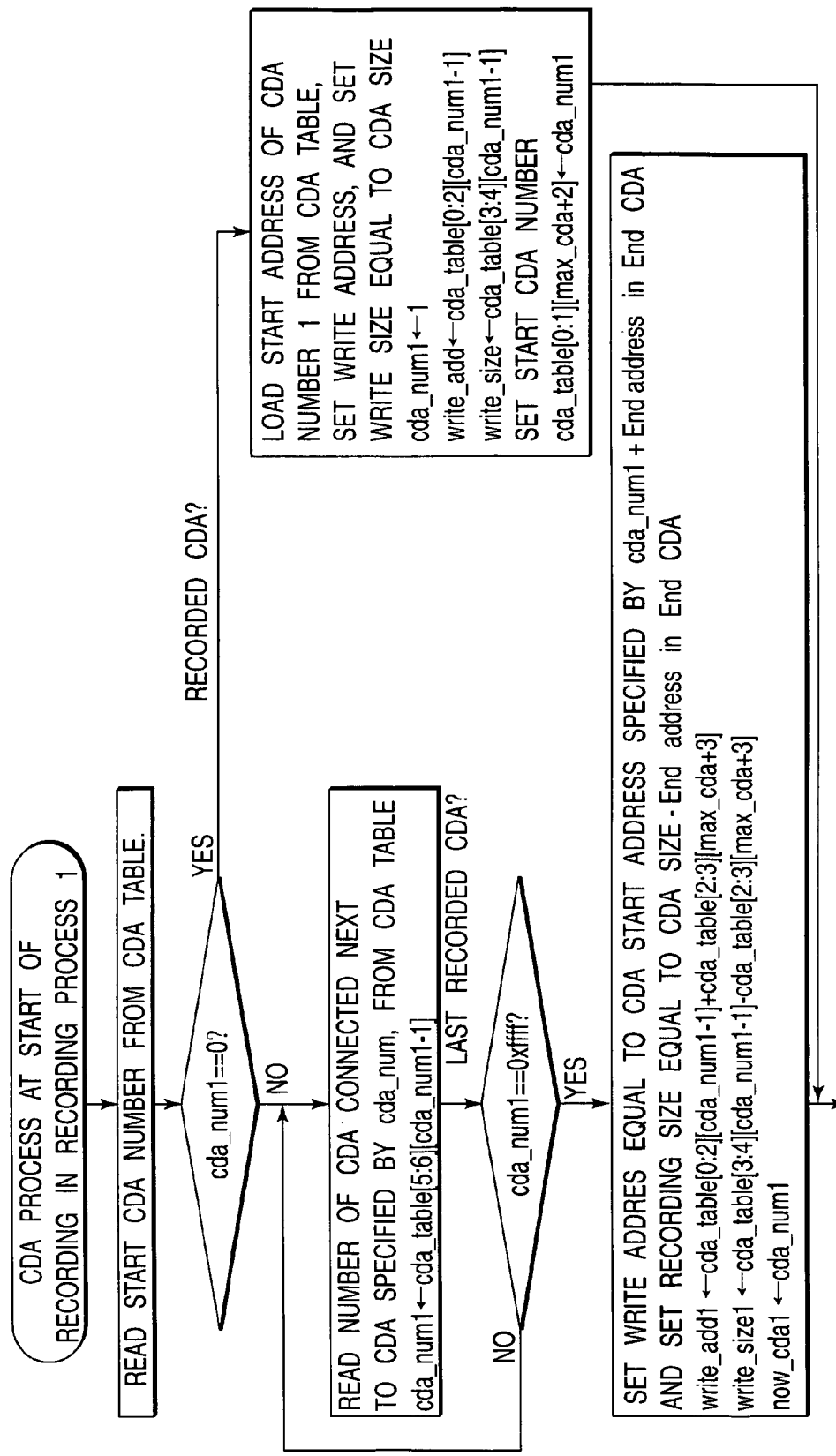
FIG. 14 is a flow chart useful for explaining a CDA process operation at the start of recording in a video recording process 1.

Next, a CDA process operation for the recording process 1 at the start of recording will be explained with reference to the flow chart shown in FIG. 14.

1. The start CDA number is read from the CDA table.

2. If the start CDA number is "0000", this means that there is no CDA recorded. Accordingly, the process shifts to processing in 6.

3. The CDA number connectively following the CDA specified by cda_num1 is read and loaded in the cda_num1.

4. It is checked whether cda_num1="0xffff". If not, the process shifts to the processing in 3.

5. A recording start address is set equal to the sum of the CDA start address specified by the cda_num1 and the value of End address in End CDA, and a recording size is set equal to the current CDA size minus the value of the End address in End CDA. Then the process is completed.

6. The recording start address is set equal to the CDA start address with CDA number 1, the recording size is set equal to be current CDA size, and the start CDA number is set at "0x0001". Then, the process is completed.

That is, if there is previously recorded data, recording is started following this data, and if there is no such data, recording is started at the leading CDA of the CDA table.

Figure 15:
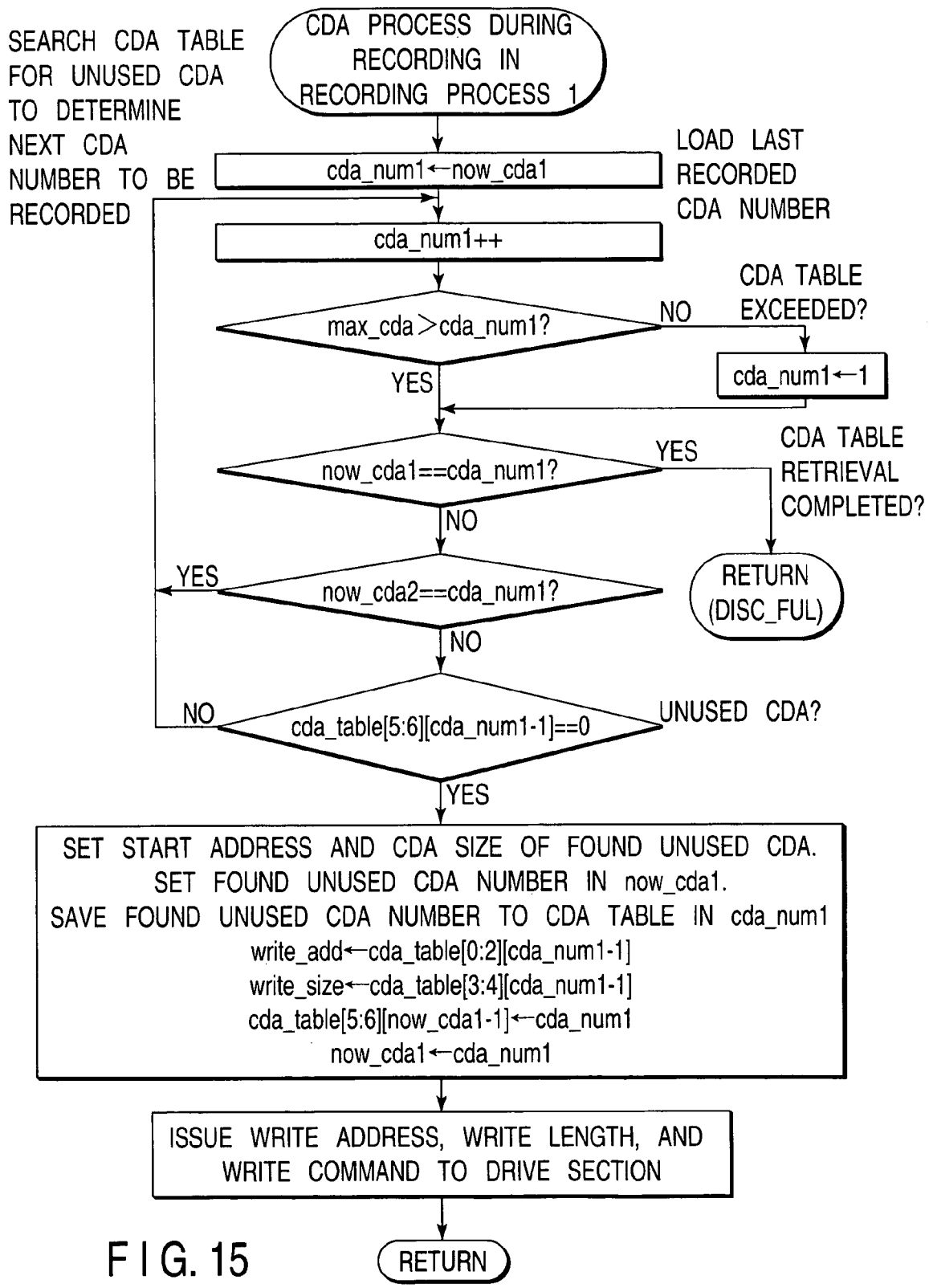
FIG. 15 is a flow chart useful for explaining a CDA process operation during recording in the video recording process 1.

Further, a CDA process operation for the recording process 1 during recording will be explained with reference to the flow chart shown in FIG. 15.

1. The last recorded CDA number is loaded and the subsequent CDAs are searched for unused one (the next CDA number="0000"). If the CDA table has been searched through without finding such a CDA, there is no CDA for recording, so that this is communicated to a main routine and the process is completed.

2. If an unused CDA is found, it is checked whether this CDA is being used during the recording process 2. If so, the process shifts to the processing in 1. If this CDA is not being used in he recording process 2, the start address and CDA size of the found unused CDA are set equal to a recording address and size for the next recording. Then, the number of the found unused CDA is set in the CDA number next to the last CDA section recorded in the CDA table and in now_cda1, to complete the process.

Thus, the data are recorded in the unused CDA beyond (in the recording direction) the recorded CDAs. In this case, the CDAs being recorded in the recording process 2 are avoided. If, however, there is no unused area in the recording direction, a read-in head is moved to check again whether there is an unrecorded area in the recording direction.

Figure 16:
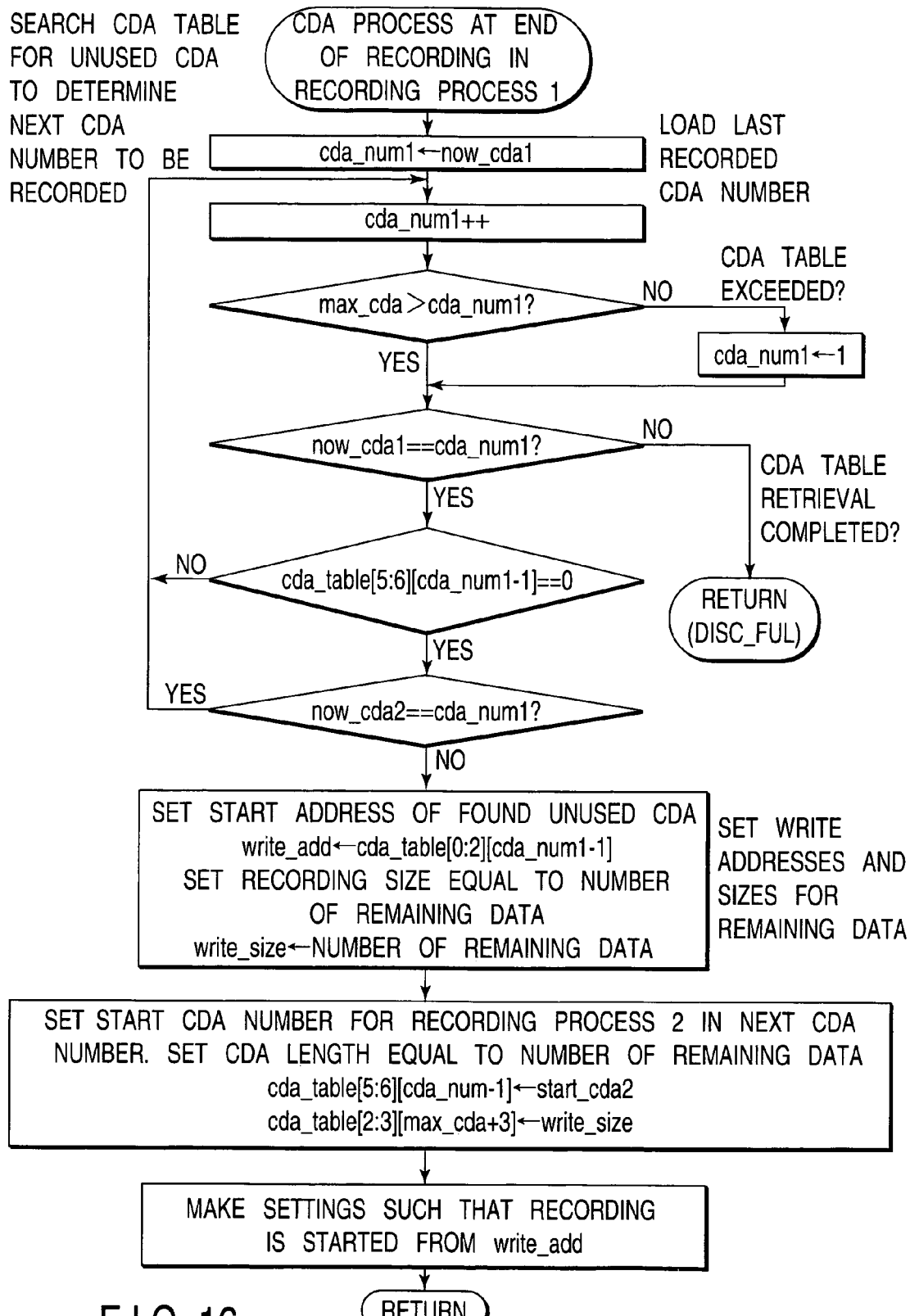
FIG. 16 is a flow chart useful for explaining a CDA process operation at the end of recording in the video recording process 1.

Further, a CDA process operation for the recording process 1 at the end of recording will be explained with reference to the flow chart shown in FIG. 16.

1. The last recorded CDA number is loaded and the subsequent CDAs are searched for unused one (the next CDA number="0000"). If the CDA table has been searched through without finding such a CDA, there is no CDA for recording, so that this is communicated to the main routine and the process is completed.

2. If an unused CDA is found, it is checked whether this CDA is being used in the recording process 2. If so, the process shifts to the processing in 1. If this unused CDA is not being used in the recording process 2, the start address of the found unused CDA and the number of the remaining unrecorded data to be recorded are determined to be the recording address and size for the next recording, respectively, and the CDA number used at the start of the recording in the recording process 2 is set in the number of the CDA next to the last CDA recorded in the CDA table. Further, the remaining data are set in the CDA length for recording to complete the process.

That is, after the recording in the recording process 1 has been completed, the CDA next to the last one is set to connect to the leading one of the group of CDAs resulting from the recording process 2. If, however, there is no unused area in the recording direction, the read-in head is moved to check again whether there is an unused area in the recording direction.

Figure 17:
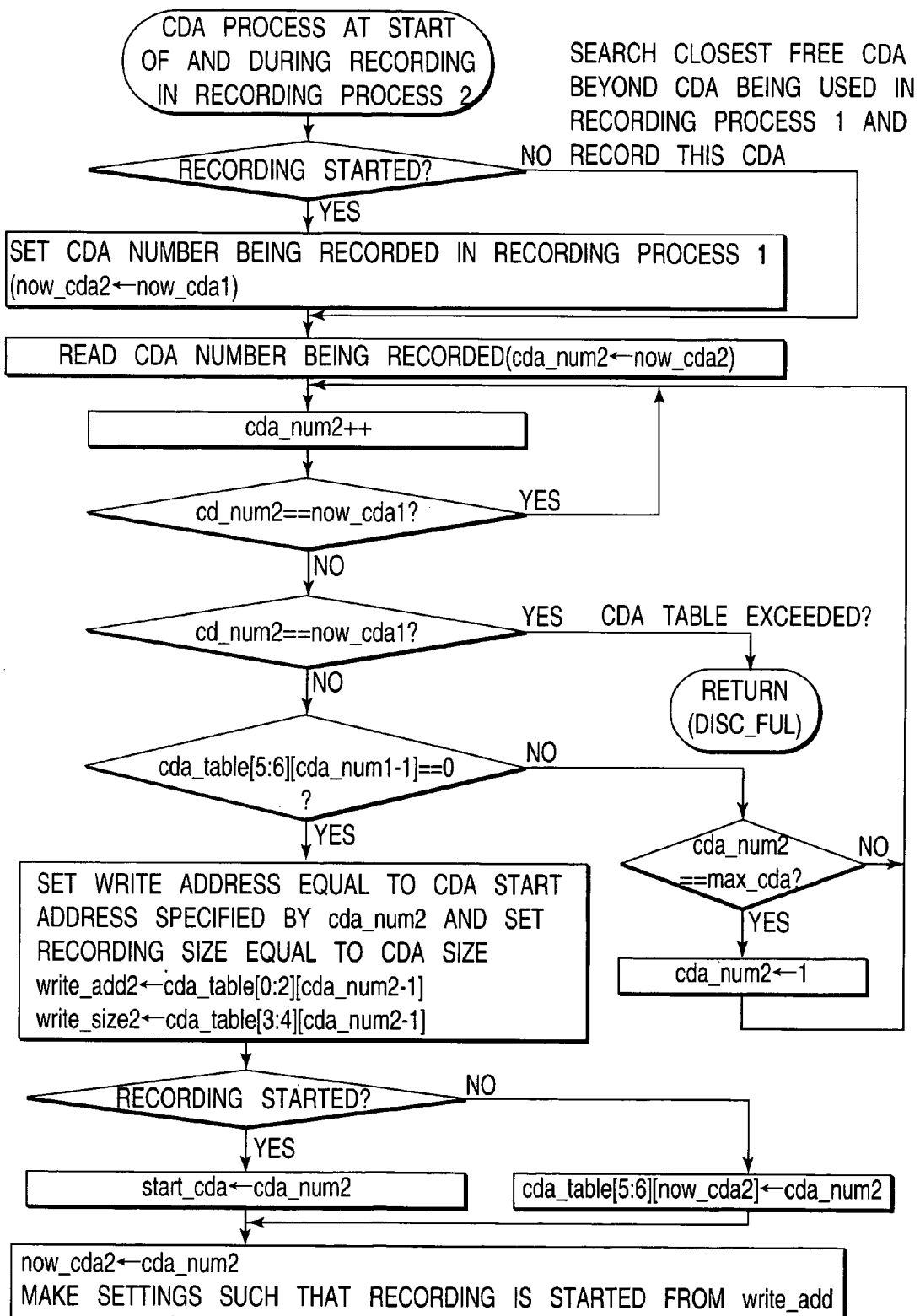
FIG. 17 is a flow chart useful for explaining a CDA process operation at the start of and during recording in a video recording process 2.

Moreover, a CDA process operation at the start of and during recording in the recording process 2 will be explained with reference to the flow chart in FIG. 17.

1. It is checked whether recording has just been started, and if so, the CDA number being recorded in the recording process 1 is determined to be the last CDA number (now_cda2←now_cda1) recorded in the recording process 2.

2. The last recorded CDA number is read (cda_num2←now_cda2).

3. The CDA number (cda_num2) is incremented to check whether each of the subsequent CDAs is unused.

4. The CDAs following the cda_num2 are searched for an unused one (the CDA number="0000"). If the CDA table has been searched through without finding such a CDA, there is no CDA for recording, so that this is communicated to the main routine and the process is completed.

5. If an unused CDA is found, it is checked whether this CDA is being used in the recording process 1. If so, the process shifts to the processing in 3. If this unused CDA is not being used in the recording process 1, the start address and CDA size of the found unused CDA are determined to be the recording address and size for the next recording, respectively. Then, the number of the found unused CDA is set in the number of the CDA next to the last CDA recorded in the CDA table and in the now_cda2, to complete the process.

That is, the data are recorded in the unused CDA beyond (in the recording direction) the recorded CDAs. In this case, the CDAs being recorded in the recording process 1 are avoided. If, however, there is no unused area in the recording direction, the read-in head is moved to check again whether there is an unrecorded area in the recording direction.

Figure 18:
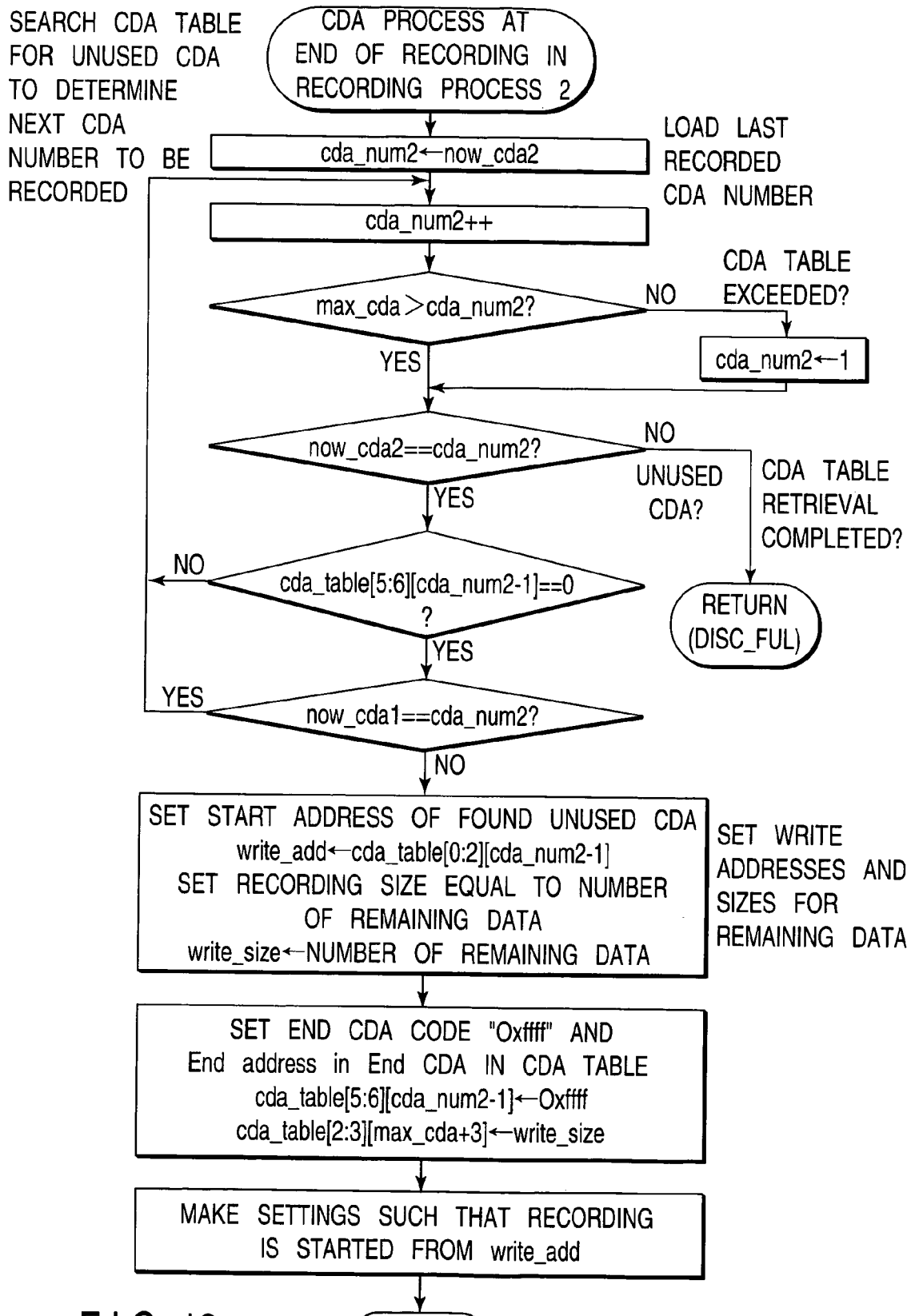
FIG. 18 is a flow chart useful for explaining a CDA process operation at the end of recording in the video recording process 2.

Further, a CDA process operation at the end of recording in the recording process 2 will be explained with reference to the flow chart in FIG. 18.

1. The last recorded CDA number is loaded (cda_num2←now_cda2).

2. The CDAs subsequent to the program shown by the cda_num2 are searched for an unused one (the next CDA number="0000"). If the CDA table has been searched through without finding such a CDA, there is no CDA for recording, so that this is communicated to the main routine and the process is completed.

3. If an unused CDA is found, it is checked whether this CDA is being used in the recording process 1. If so, the process shifts to the processing in 2.

4. The start address of the found unused CDA and the number of the remaining unrecorded data to be recorded are determined to be the recording address and size for the next recording, respectively, and "0xffff" is set, as an end code, in the number of the CDA next to the last CDA recorded in the CDA table. Further, the number of remaining data to be recorded is set in the End Address in End CDA to complete the process.

Figure 19A:
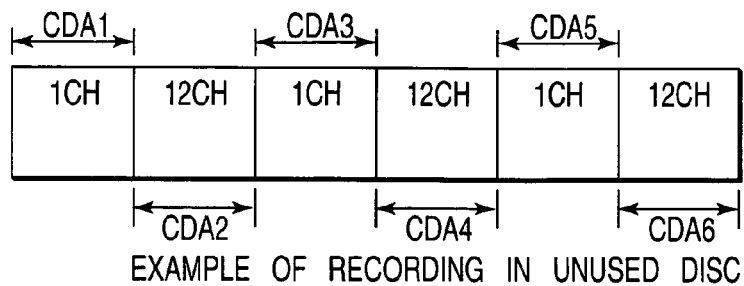
FIGS. 19A and 19B are views useful for explaining physically recorded CDA-based images for use in recording two programs, according to the embodiment.
Figure 19B:
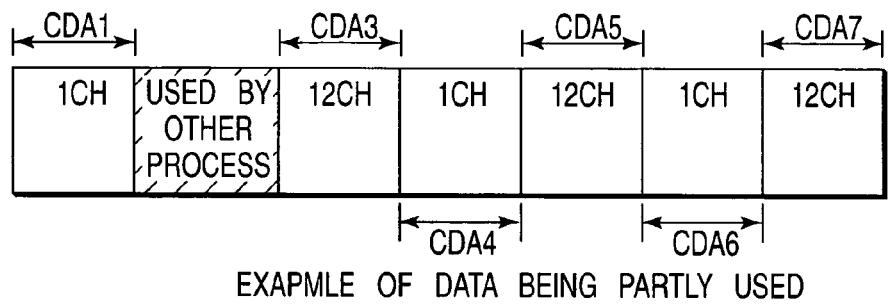

This CDA process allows each CDA recorded in the recording process 1 and each CDA recorded in the recording process 2 to be alternately recorded as shown in FIGS. 19A and 19B. The other used CDAs are skipped during recording.

Then, the VOB resulting from the recording process 1 is defined as a VOB1 and the VOB resulting from the recording process 1 is defined as a VOB2 to create TMAPI based on each partitioning information.

Figure 20:
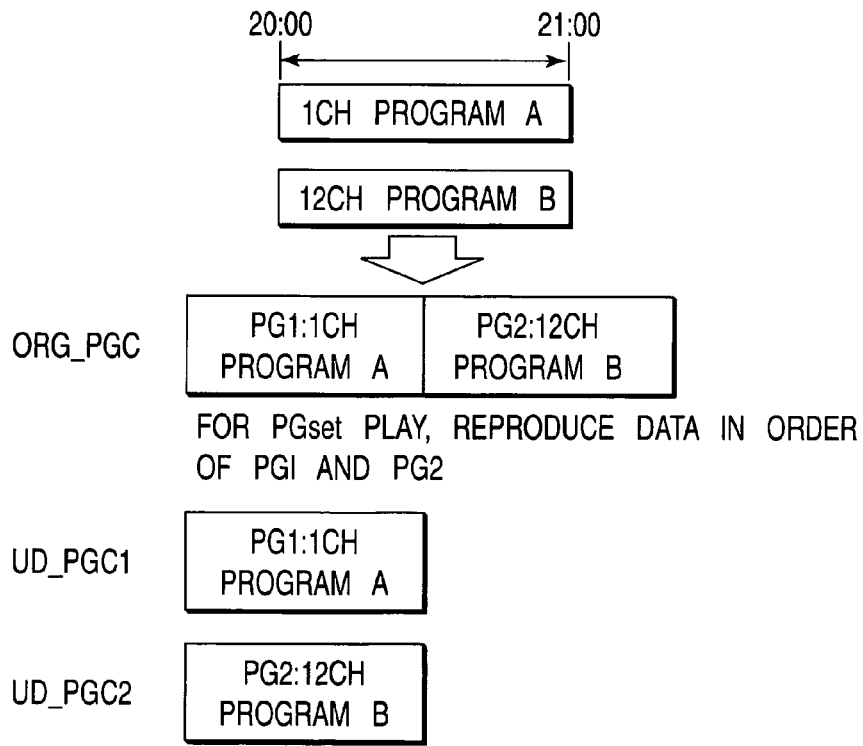
FIG. 20 is a view useful for explaining a logical structural image according to the embodiment.

Alternately, for logical images, on the ORG_PGC prepared for reproduction in the recording order, the VOB originating from the recording process 1 is defined as a PG1 and the VOB originating from the recording process 2 is defined as a PG2, to determine the reproducing order, as shown in FIG. 20.

Further, to reproduce each program, the VOBs stemming from each recording process are separately recorded in a UD_PGC (a group of PGCs prepared to allow a used to freely determine the reproducing order). Thus, to reproduce a desired program, a UD_PGC belonging to the target program can be specified. Alternately, for a set in which two programs can be simultaneously reproduced, the reproduction can be carried out by simultaneously reproducing two corresponding UD_PGCs.

Figure 21B:
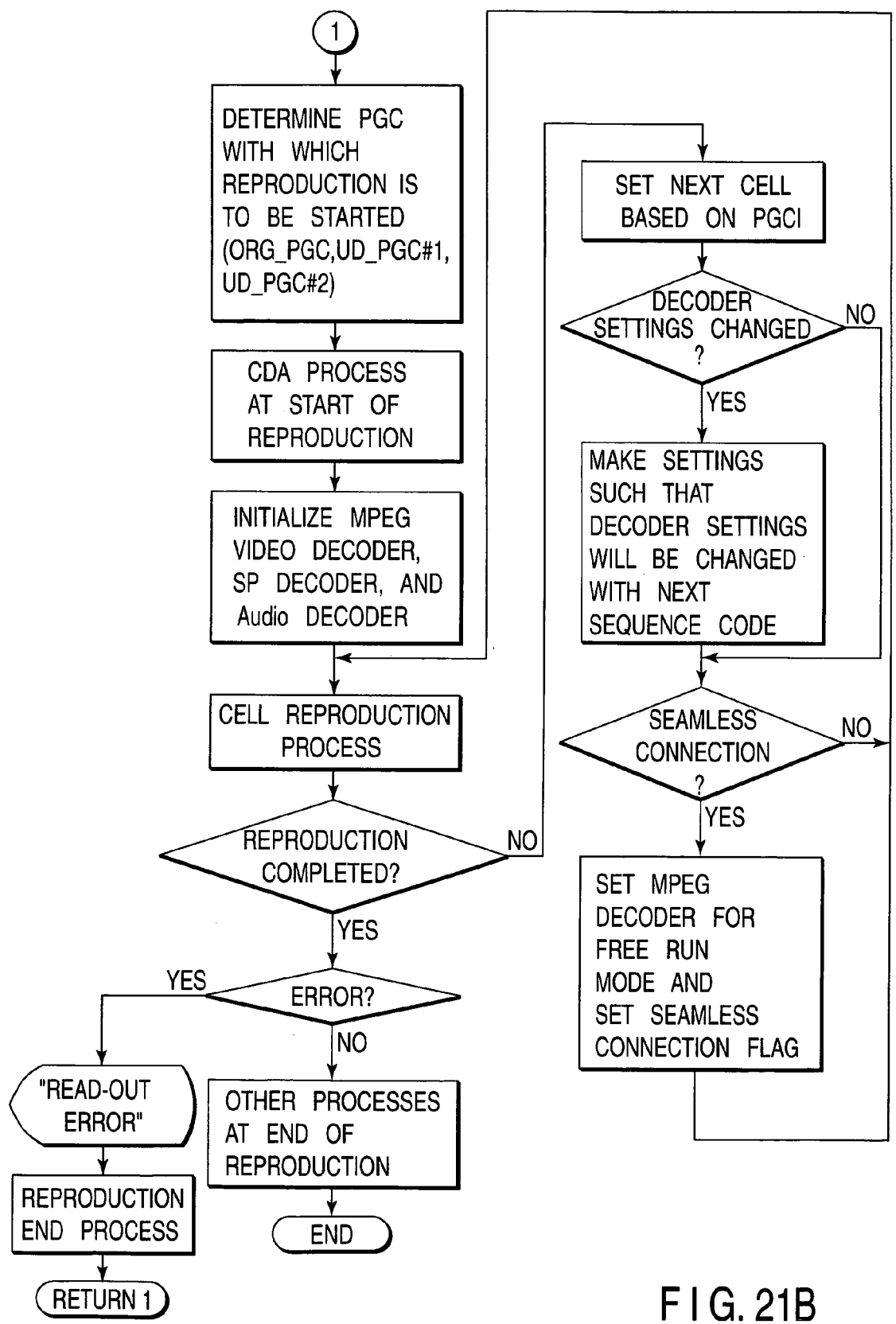

Moreover, a data process operation during reproduction will be described with reference to the flow charts shown in FIGS. 21A and 21B.

1. It is checked whether the disc is rewritable (R, RW, RAM), and if not, this is communicated to the routine and the process is completed.

2. The file system is read from the disc, and it is checked whether the file system contains a volume structure. If no volume structure is found, the message "No Image Recorded" is shown and the process is completed.

3. It is checked whether the file system contains a DVD_RTR directory. If no DVD_RTR directory is found, the message "No Image Recorded" is shown and the process is completed.

4. It is checked whether the file system contains a CDA table. If no CDA table is found, the message "No Image Recorded" is shown and the process is completed.

5. It is checked whether the file system contains a VRO file. If no VRO file is found, the message "No Image Recorded" is shown and the process is completed.

6. The VMG file is loaded, the program and cell to be reproduced is determined (the user is prompted to do so), and a file pointer (a logical address) at which reproducing is started is determined. If the reproduction in the recording order is selected, it is carried out in accordance with the ORG_PGCI. If the programs are to be individually reproduced, the reproduction is carried out in accordance with the UD_PGC for the number corresponding to the desired program. Alternatively, if two programs to be simultaneously reproduced, the UD_PGC1 and UD_PGC2 are selected and the process shown below is carried out for each task in a time-sharing manner.

7. The CDA process at the start of reproduction, described below, is carried out.

8. Each decode section is initialized.

9. A cell reproduction process, described below, is carried out, and it is checked whether the reproduction has been completed. If so, an error check is executed, and if an error is found, this is indicated. If no error is found, a reproduction completion process is carried out to complete this operation.

10. The next cell is determined from the PGCI, and it is checked whether settings for each decode section have been changed. If so, the changed attributes are set in each decode section so that the settings for each decode section are changed during the next sequence encoding (at the end of the VOB).

11. It is checked whether settings (resolution and the like) for the video decode section 15c have been changed. If so, the changed attributes are set in the decode section so that the settings for the decode section are changed after the last sequence encoding for the cell (the VOB).

12. It is checked whether the connection is seamless. If so, an operation mode of the video decode section 15c is set to a free run mode (decode and display operations are not performed in accordance with the STC but in accordance with video synchronization signals), a seamless connection flag is set, and the process transfers to the processing in 9.

Figure 22A:
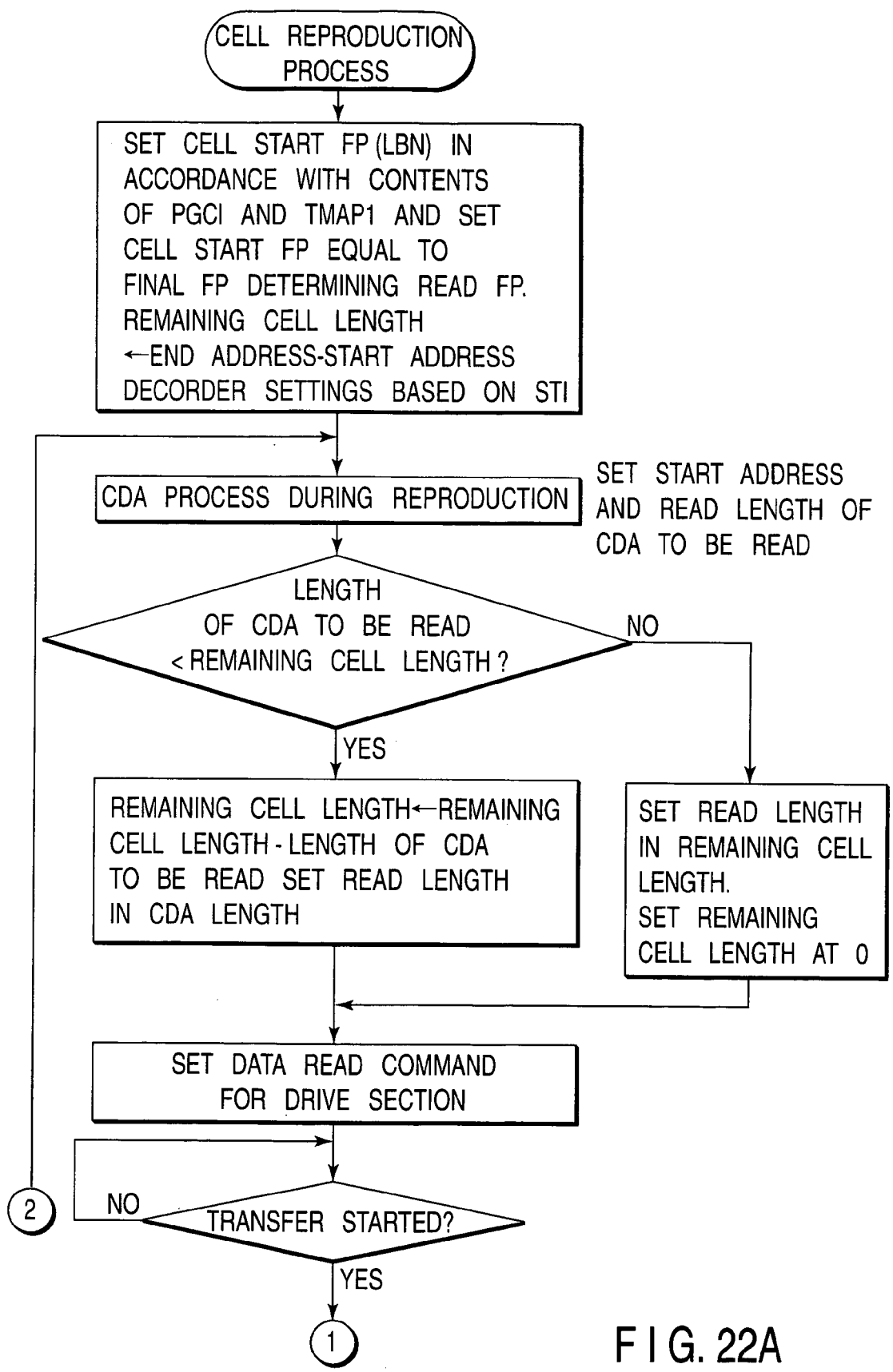
FIGS. 22A and 22B are flow charts useful for explaining a cell reproduction process operation according to the embodiment.
Figure 22B:
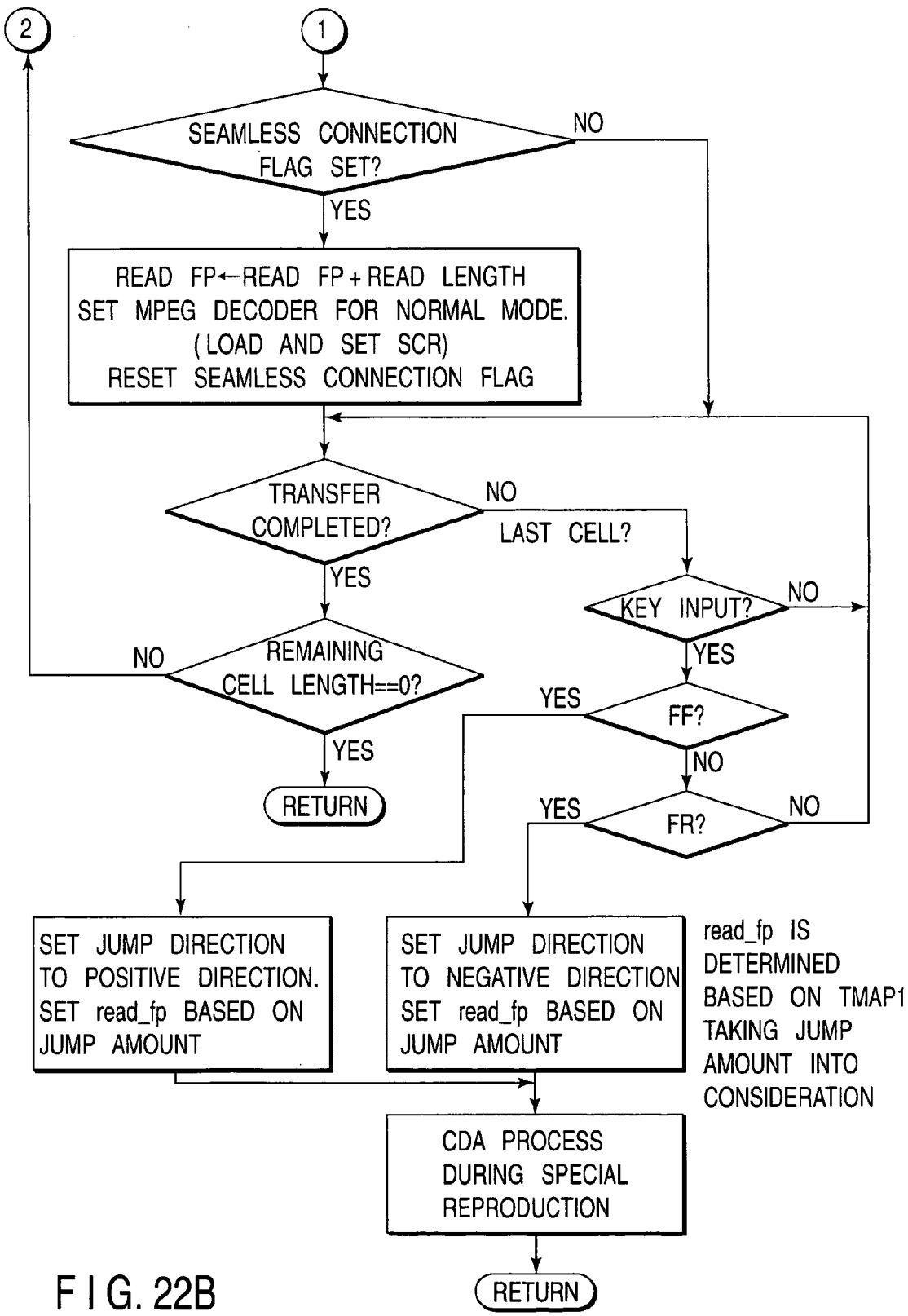

Moreover, a cell reproduction process operation will be explained with reference to the flow charts in FIGS. 22A and 22B.

1. A cell start file pointer (a logical block address) and an end address file pointer (a logical address block) are determined in accordance with the PGCI and the TMAPI, a read FP is set equal to a cell start FP, and a final file pointer minus a start file pointer is set in a remaining cell length.

2. The CDA process during reproduction, described below, is carried out, and a read address and a read size are determined from the start file pointer.

3. The read CDA size is compared with the remaining cell length, and if the remaining cell length is larger, the remaining cell length minus the read CDA size is set in the remaining cell length. If the remaining cell length is smaller, the read length is set in the remaining cell length, which is then set at zero.

4. Set a read length equal to the length of the CDA.

5. Set the read address, the read length, and a read command for the disc drive section 21.

6. It is checked whether a transfer has been started, and if not, the process waits until one is started.

7. The read FP plus the read length set in the processing in 5 is set in the read FP. It is checked whether the connection is seamless, and if so, shift the decode section to a normal mode and an SCR is loaded.

8. It is checked whether the transfer has been completed. If so, the remaining cell length is checked, and if it is not "00", the process shifts to the processing in 2. If it is "00", the process is completed.

9. If the transfer has not been completed, a key input is checked. If special reproduction is to be executed, then its direction is set, the TMAPI is used to calculate the read FP, a CDA process during special reproduction is executed. The process is then completed. If the special reproduction is not to be executed, the process shifts to the processing in 8. A special reproduction target FP is determined from the TMAPI in a fashion skipping a fixed period of time. Alternatively, the FP may be determined by skipping a fixed number of VOBUs instead of the fixed period of time. In this case, once the end of the cell has been reached, the next cell information is read in accordance with the PGCI, the TMAPI is selected based on the VOB number being used by the cell (one TMAPI is present in one VOB), and the read FP is determined in the same manner. In addition, once the cell has been exhausted, the process is completed.

Figure 23:
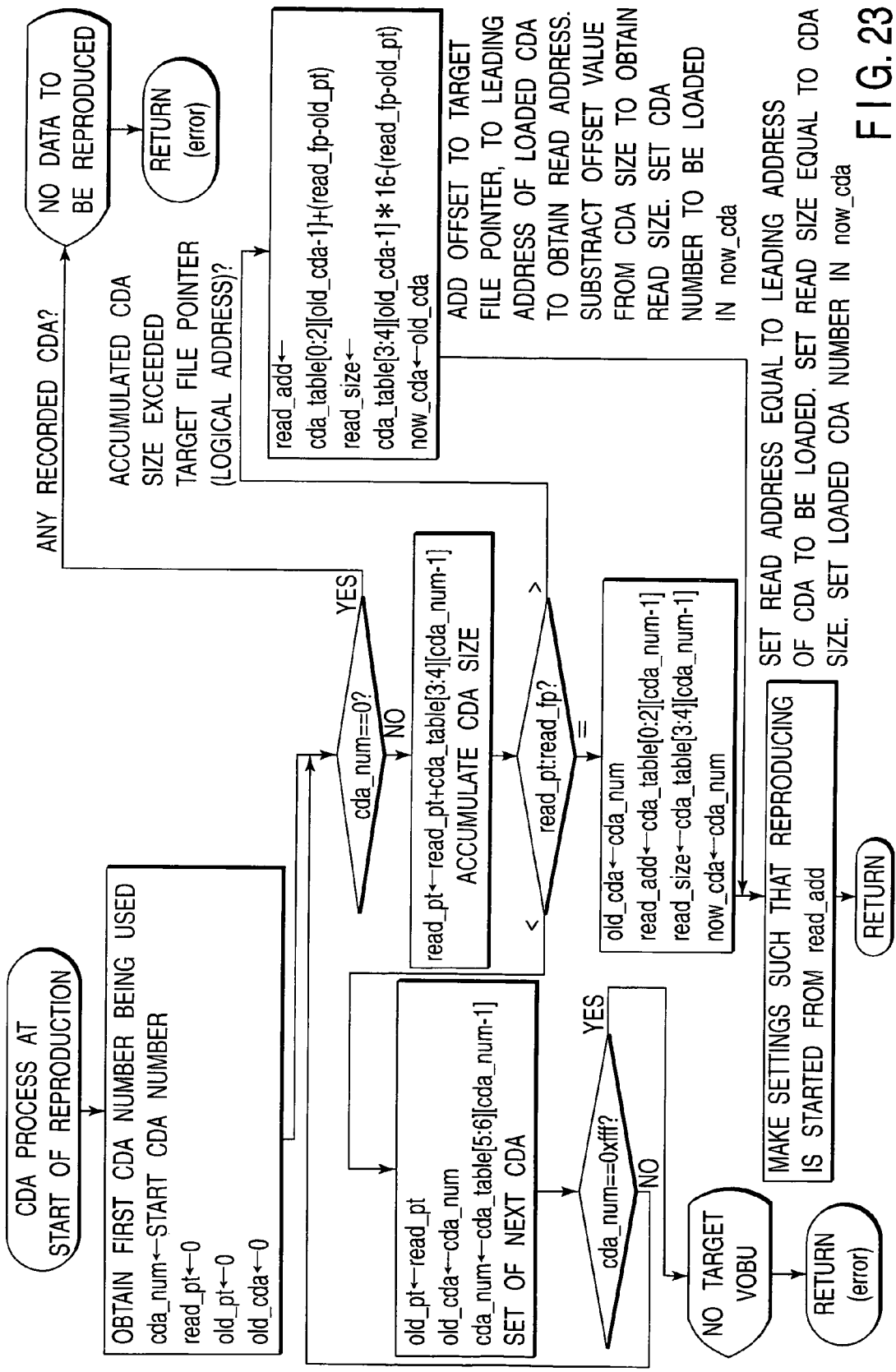
FIG. 23 is a flow chart for explaining a CDA process operation at the start of reproduction according to the embodiment.

Then, a CDA process operation at the start of reproduction will be explained with reference to the flow chart shown in FIG. 23.

1. The first recorded CDA number is read and loaded in the cda_num, and a read_pt (a read pointer) and an old_pt (a preceding read pointer) are each set at zero.

2. It is checked whether the first recorded CDA number is "0x0000". If so, the message "No Data To Be Reproduced" is displayed and the process is completed.

3. The length of the CDA indicated by the cda_num plus the contents of the read_pt is set in the read_pt.

4. The value of the read_fp [a read target file pointer (LBN)] is compared with the value of the read_pt. If the read_fp has a larger value, the read_pt is set in the old_pt, the cda_num is set in the old_cda (preceding CDA), the next CDA number is set in the cda_num, and the process shifts to the processing in 3.

5. If the read_pt is equal to the read_fp, the read address is set equal to the start address of the CDA indicated by the cda_num, the read size is set equal to the CDA length, and the process is completed.

6. If the read_fp is smaller than the read_pt, the target CDA is set equal to the old_cda, the read address is set equal to the start address of the CDA indicated by the old_cda, the read size is set equal to the CDA length, and the process is completed.

Figure 24:
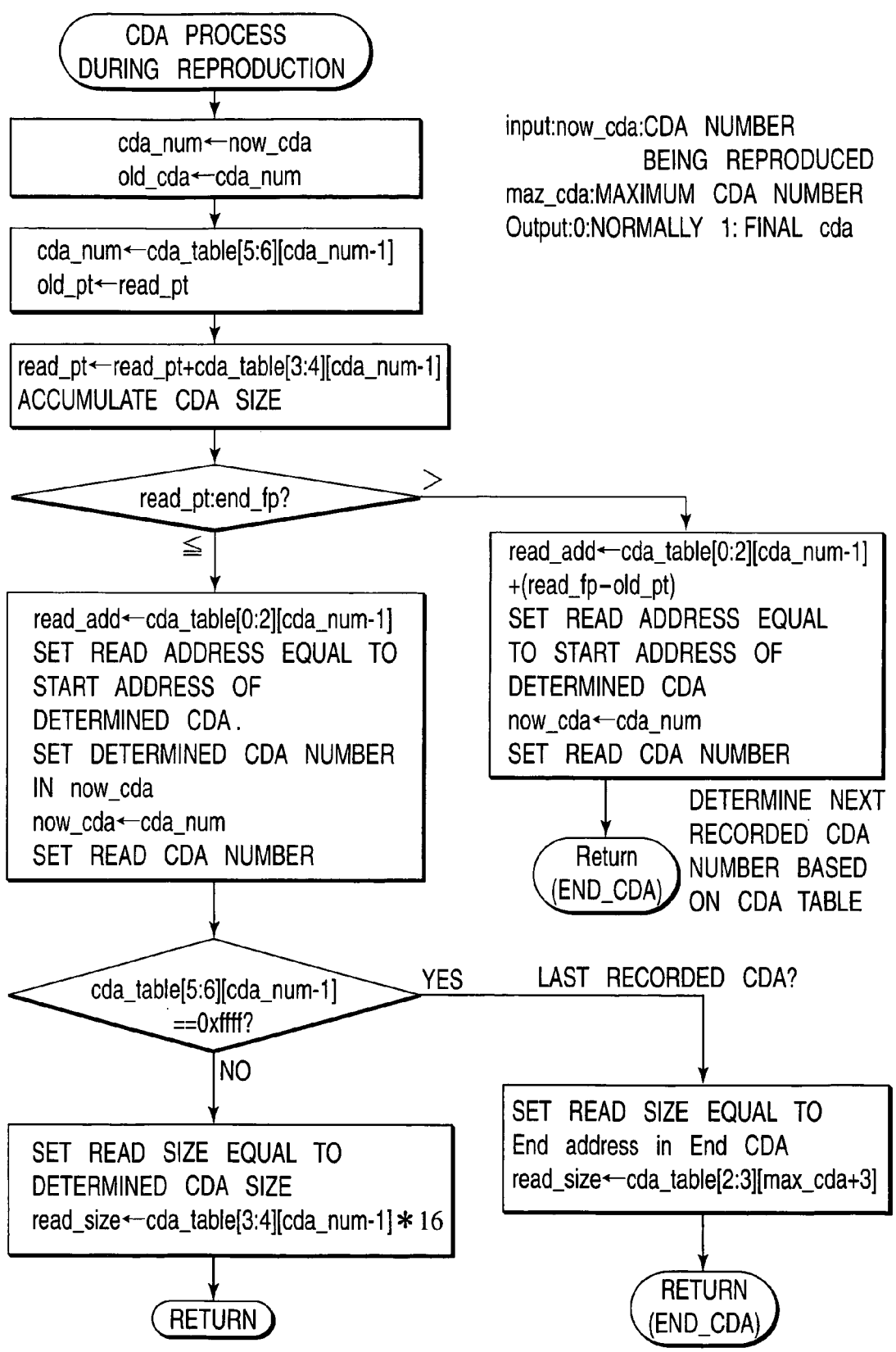
FIG. 24 is a flow chart useful for explaining a CDA process operation during reproduction according to the embodiment.

Further, a CDA process operation during reproduction will be described with reference to the flow chart shown in FIG. 24.

1. The value of a now_cda is set in the cda_num to determine the next CDA number (a cda_table[5:6] [cda_num−1] is set in the cda_num), and the read_pt is set in the old_pt.

2. The length of the CDA indicated by the cda_num plus the contents of the read_pt is set in the read_pt.

3. The value of an end_fp [a read end target file pointer (LBN)] is compared with the value of the read_pt. If the read_fp has a larger value, the process shifts to processing in 4, and if it has a smaller value, the process shifts to processing in 5.

4. The read address is set equal to the start address of the CDA indicated by the cda_num, the read size is set equal to the CDA length, and the process shifts to processing in 6.

5. The read size is set equal to the start address of the CDA indicated by the cda_num, the read size is set equal to the CDA length minus the read pointer preceding the end_pt, a FILE_END is determined to be an argument, and the process is completed.

6. It is checked whether the CDA is final. If so, the read size is set equal to an End Address in End CDA, an END_CDA is determined to be the argument, and the process is completed.

7. If the CDA is not final, the read size is set equal to the CDA size, and the process is completed.

Figure 25A:
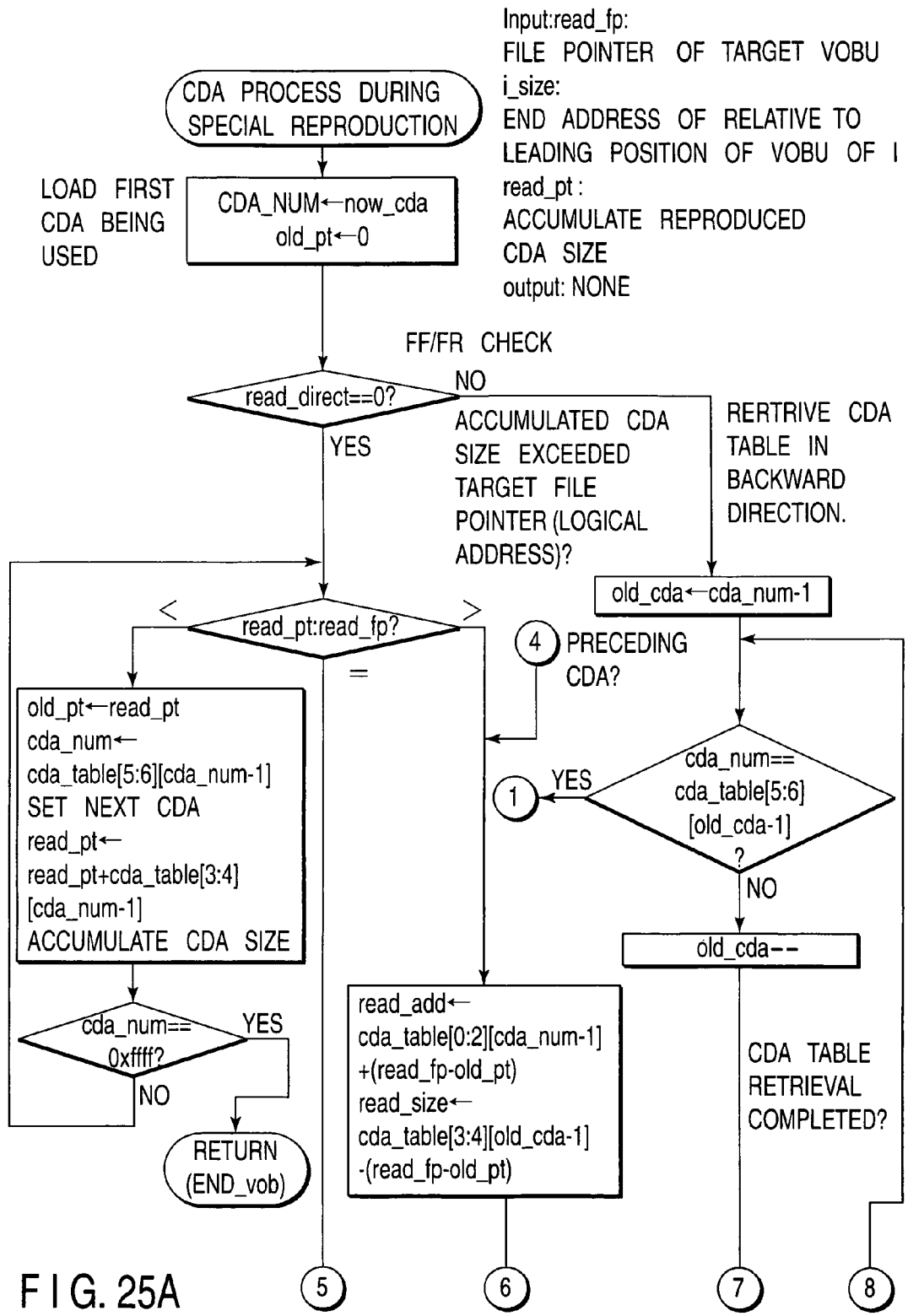
FIGS. 25A to 25C are flow charts useful for explaining a CDA process operation during special reproduction according to the embodiment.
Figure 25B:
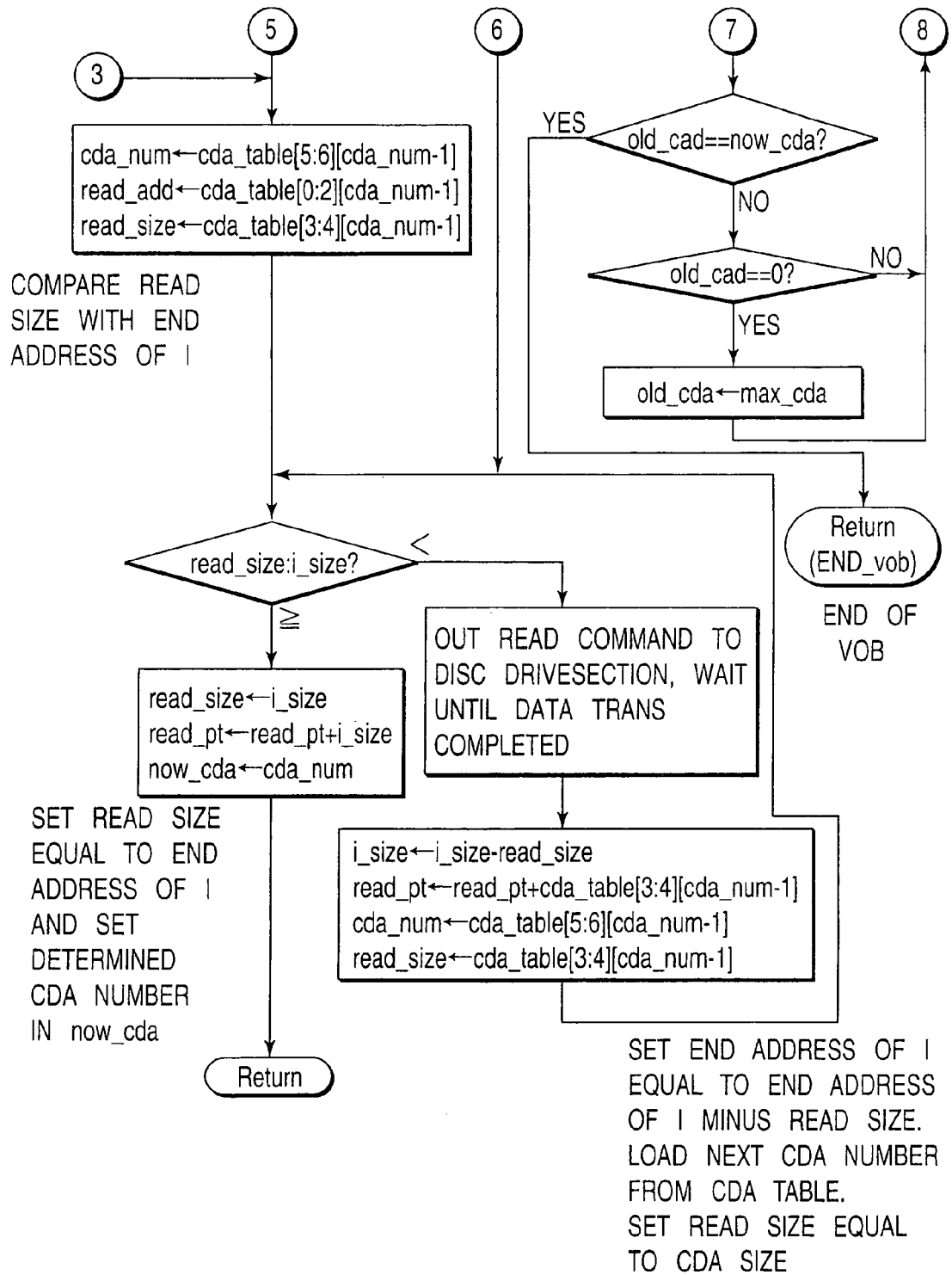
Figure 25C:
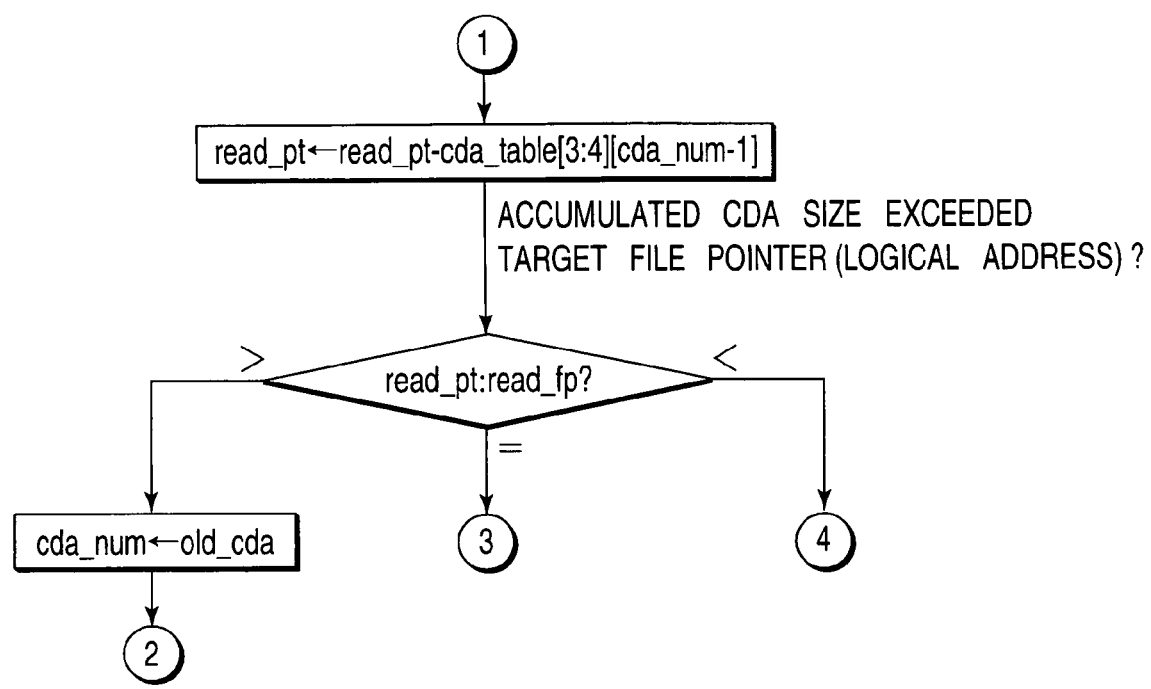

Further, a CDA process operation during the special reproduction will be explained with reference to the flow charts in FIGS. 25A to 25C.

1. The value of the now_cda is set in the cda_num to determine the next CDA number (the cda_table[5:6] [cda_num−1] is set in the cda_num), and the read_pt is set in the old_pt.

2. A read direction is checked, and if the direction is FF, the process shifts to processing in 3, whereas if the direction is FR, the process shifts to processing in 7.

3. The read_pt is compared with the read_fp (the read target FP). If the read_fp is larger, the CDA number of the next CDA is added to the read_pt. It is checked whether the CDA is final, and if so, an END_VOB is determined to be the argument and the process is completed. If the CDA is not final, the process shifts to the processing in 3.

4. If the read_fp is equal to the read_pt, the read address is set equal to the start address of the current CDA, and the read size is set equal to the CDA size.

5. The read size is compared with the end address of an I. If the read size is smaller, the read command is issued to the disc drive section 21. After the data have been read out, the end address of the I is set equal to the end address of the I minus the read size, the read address and size are set equal to the start address and CDA size of the next CDA, respectively, and the process shifts to the processing in 5.

6. If the end address is smaller, then the read size is set equal to the end address of the I, the read command is issued to the disc drive section 21, and the process is completed.

7. The preceding CDA is searched for (this CDA has the current cda_num equal to that of a destination CDA), and if it is found, the read_pt minus the CDA length is set in the read_pt. The read_pt is compared with the read_fp, and if the read_pt is larger, the old_cda is set in the cda_num and the process shifts to processing in 7.

8. If the read_pt is equal to the read_fp, the process shifts to the processing in 4, and if the read_pt is smaller, the process shifts to the processing in 6.

9. If the CDA table is searched through without finding the CDA, the END_VOB is determined to be the argument and the process is completed.

In addition, the CDA unit can be used to subject the CDA table to deletions, editions, or the like without posing any problem.

It is reasonable and likely that the user temporally edit the CDA table (using a video frame unit). This may be different from the edition using the CDA unit. Thus, if the VOBU unit and the frame unit are used for deletions or editions, a display start frame is shifted within the VOBU.

Accordingly, the CDA unit is typically used for deletions or the like, and the CDA length is reduced or the CDA start address is shifted to obtain smaller units.

If, however, the CDA table is repeatedly changed as described above, efficiency decreases. Thus, when editions and deletions are repeated, the CDA table must be rearranged at fixed time intervals to find a contiguous unused CDA length in order to define it as new CDAs.

Two types of timings are possible for such operations.

First, a fixed number of times that the CDA table has been rewritten for deletions or editions is used as a trigger.

Second, after a fixed period of time has passed, the operation is automatically performed during an extra time.

In addition, two forms are possible for the encoder section 16 as shown in FIGS. 26 and 27.

First, the number of video encode sections or audio encode sections equals the number of programs that can be simultaneously recorded, as shown in FIG. 26. This method is simple but requires a large circuit.

Second, the number of frame memory sections equals the number of programs that can be simultaneously recorded, a set of a video encode section and an audio encode section are provided, a fixed amount of data (one frame or one GOP) are encoded each time, and the program is switched for the encoding process, as shown in FIG. 27. According to this method, a work memory is provided for each program so that the work memory is switched each time the program encoding process is switched, thereby enabling the encoding process to be executed in a time-sharing manner. This method complicates the encoding process but requires a relatively small circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multichannel recording device configured to record data on a disk-shaped recording medium that includes an object area in which object data corresponding to programs are recorded and a management area in which management data is recorded, said multichannel recording device comprising:

receiving means for simultaneously receiving a first program and a second program, which are different from each other;

encoding means for encoding the first and second programs in parallel so as to obtain object data corresponding to the first and second programs;

recording means for alternately recording the object data, obtained by the encoding means and corresponding to the first and second programs, in the object area of the disk-shaped recording medium such that the object data are recorded based on a data length that enables continuous data reproduction;

reproduction means for reproducing the object data which the recording means records in the object area; and control means for recording the management data in the management area of the disk-shaped recording medium, wherein the management data controls the reproduction means to reproduce the first and second programs in an order determined by channel numbers or recording start times, wherein said specified data length unit is a CDA unit and the control means records reproduction management data in the management area of the disk-shaped recording medium, separate from the management data for managing the object date, and the reproduction management data controls the reproduction means to reproduce the first and second programs in an order determined by channel numbers or recording start times.

2. A multichannel recording device according to claim 1, wherein while the digital data constituting said first and second programs are being alternately recorded on said disc-shaped recording medium using said specified data length unit, if there is an area in the recording direction where other data are recorded, said control means skips the area during the recording.

3. A multichannel recording device configured to record data on a disk-shaped recording medium including an object area in which object data corresponding to programs are recorded and a management area in which management data is recorded, said multichannel recording device comprising:

receiving means for simultaneously receiving a first program and a second program, which are different from each other;

encoding means for encoding the first and second programs in parallel so as to obtain object data corresponding to the first and second programs;

recording means for alternately recording the object data, obtained by the encoding means and corresponding to the first and second programs, in the object area of the disk-shaped recording medium such that the object data are recorded based on a data length that enables continuous data reproduction;

reproduction means for reproducing the object data which the recording means records in the object area; and control means for recording the management data in the management area of the disk-shaped recording medium, wherein the management data controls the reproduction means to reproduce a requested program, the requested program being one of the first or second programs, wherein said specified data length unit is a CDA unit and the control means records reproduction management data in the management area of the disk-shaped recording medium, separate from the management data for managing the object date, and the reproduction management data controls the reproduction means to reproduce a requested program, the requested program being one of the first or second programs.

4. A multichannel recording device according to claim 3, wherein while the digital data constituting said first and second programs are being alternately recorded on said disc-shaped recording medium using said specified data length unit, if there is an area in the recording direction where other data are recorded, said control means skips the area during the recording.

5. A multichannel recording method for recording data on a disk-shaped recording medium that includes an object area in which object data corresponding to programs are recorded and a management area in which management data is recorded, said method comprising:

simultaneously receiving a first program and a second program, which are different from each other;

encoding the first and second programs in parallel so as to obtain object data corresponding to the first and second programs;

alternately recording the object data obtained by the encoding of the first and second programs in the object area of the disk-shaped recording medium such that the object data are recorded based on a data length that enables continuous data reproduction;

reproducing the object data recorded in the object area;

controlling the recording of the management data in the management area of the disk-shaped recording medium in which the management data controls the reproduction of the first and second programs in an order determined by channel numbers or recording start times; and controlling the recording of reproduction management data in the management area of the disk-shaped recording medium, separate from the management data for managing the object data, wherein the reproduction management data controls the reproduction of the first and second programs in an order determined by channel numbers or recording start times, wherein said specified data length unit is a CDA unit.

6. A multichannel recording method according to claim 5, wherein while the digital data constituting said first and second programs are being alternately recorded on said disc-shaped recording medium using said specified data length unit, if there is an area in the recording direction where other data are recorded, the area is skipped during said recording.

7. A multichannel recording method for recording data on a disk-shaped recording medium that includes an object area in which object data corresponding to programs are recorded and a management area in which management data is recorded, said method comprising:

simultaneously receiving a first program and a second program, which are different from each other;

encoding the first and second programs in parallel so as to obtain object data corresponding to the first and second programs;

alternately recording the object data obtained by the encoding of the first and second programs in the object area of the disk-shaped recording medium such that the object data are recorded based on a data length that enables continuous data reproduction;

reproducing the object data recorded in the object area;

controlling the recording of the management data in the management area of the disk-shaped recording medium in which the management data controls the reproduction of a requested program, the requested program being one of the first or second programs; and controlling the recording of reproduction management data in the management area of the disk-shaped recording medium, separate from the management data for managing the object data, wherein the reproduction management data controls the reproduction of a requested program, the requested program being one of the first or second programs, wherein said specified data length unit is a CDA unit.

8. A multichannel recording method according to claim 7, wherein while the digital data constituting said first and second programs are being alternately recorded on said disc-shaped recording medium using said specified data length unit, if there is an area in the recording direction where other data are recorded, the area is skipped during said recording.

* * * * *